United States Patent
Li et al.

(10) Patent No.: US 11,183,860 B2
(45) Date of Patent: *Nov. 23, 2021

(54) SYSTEMS AND METHODS FOR DISCHARGING AN AC INPUT CAPACITOR WITH AUTOMATIC DETECTION

(71) Applicant: ON-BRIGHT ELECTRONICS (SHANGHAI) CO., LTD., Shanghai (CN)

(72) Inventors: Miao Li, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,390

(22) Filed: Jan. 6, 2020

(65) Prior Publication Data

US 2020/0144834 A1 May 7, 2020

Related U.S. Application Data

(63) Continuation of application No. 15/835,232, filed on Dec. 7, 2017, now Pat. No. 10,566,809, which is a
(Continued)

(51) Int. Cl.
*H02J 7/00* (2006.01)
*H02M 7/219* (2006.01)
*H02J 7/34* (2006.01)

(52) U.S. Cl.
CPC ......... *H02J 7/0036* (2013.01); *H02J 7/0047* (2013.01); *H02J 7/0063* (2013.01); *H02M 7/219* (2013.01); *H02J 7/345* (2013.01)

(58) Field of Classification Search
CPC ..................................................... H02J 7/0036
(Continued)

(56) References Cited

U.S. PATENT DOCUMENTS 5,115,185 A 5/1992 Fraidlin et al.
5,986,906 A 11/1999 Ramezani et al.
(Continued)

FOREIGN PATENT DOCUMENTS

CN 1404207 A 3/2003
CN 1581663 A 2/2005
(Continued)

OTHER PUBLICATIONS

China Intellectual Property Office, Office Action dated Aug. 2, 2013, in China Patent Application No. 201010267539.5.
(Continued)

*Primary Examiner* — Yalkew Fantu
(74) *Attorney, Agent, or Firm* — Faegre Drinker Biddle & Reath LLP

(57) ABSTRACT

System and method for discharging a capacitor. An example system includes a signal detector and a discharge control component. The signal detector is configured to receive an input signal and generate a detection signal based on at least information associated with the input signal, the input signal being associated with an alternate current signal received by a capacitor including a first capacitor terminal and a second capacitor terminal. The discharge control component configured to receive at least the detection signal and generate an output signal to discharge the capacitor if the detection signal satisfies one or more conditions.

18 Claims, 15 Drawing Sheets

Related U.S. Application Data continuation of application No. 15/089,231, filed on Apr. 1, 2016, now Pat. No. 9,899,849, which is a continuation of application No. 13/367,097, filed on Feb. 6, 2012, now Pat. No. 9,374,019.

(60) Provisional application No. 61/443,637, filed on Feb. 16, 2011.

(58) Field of Classification Search
USPC .......................................................... 320/166
See application file for complete search history.

(56) References Cited

U.S. PATENT DOCUMENTS

| | | | | |
|---|---|---|---|---|
| 7,009,853 | B2* | 3/2006 | Nagel | H02M 1/088 |
| | | | | 323/271 |
| 7,492,614 | B2* | 2/2009 | Furukoshi | H02M 1/32 |
| | | | | 363/21.01 |
| 7,583,522 | B2 | 9/2009 | Hall et al. | |
| 8,897,037 | B2 | 11/2014 | Lin et al. | |
| 9,374,019 | B2 | 6/2016 | Li et al. | |
| 9,899,849 | B2 | 2/2018 | Li et al. | |
| 9,966,860 | B2 | 5/2018 | Lin et al. | |
| 10,566,809 | B2 | 2/2020 | Li et al. | |
| 2005/0226014 | A1 | 10/2005 | Chang | |
| 2005/0248968 | A1 | 11/2005 | Chang | |
| 2007/0247879 | A1 | 10/2007 | Yang | |
| 2008/0278969 | A1* | 11/2008 | Bolz | H02J 7/0014 |
| | | | | 363/17 |
| 2011/0127935 | A1* | 6/2011 | Gao | H02M 1/36 |
| | | | | 318/400.3 |
| 2012/0044723 | A1* | 2/2012 | Lin | H02M 3/33507 |
| | | | | 363/21.13 |
| 2013/0033236 | A1 | 2/2013 | Li et al. | |
| 2015/0036393 | A1 | 2/2015 | Lin et al. | |
| 2016/0329727 | A1 | 11/2016 | Li et al. | |
| 2018/0097382 | A1 | 4/2018 | Li et al. | |
| 2018/0294730 | A1 | 10/2018 | Lin et al. | |

FOREIGN PATENT DOCUMENTS

| | | |
|---|---|---|
| CN | 101714831 A | 5/2010 |
| JP | 2005-253284 A | 9/2005 |
| TW | 200537793 A | 11/2005 |

OTHER PUBLICATIONS

Taiwan Intellectual Property Office, Office Action dated Mar. 18, 2013, in related Taiwan Patent Application No. 099131847.
United States Patent and Trademark Office, Office Action dated Sep. 12, 2018, in U.S. Appl. No. 15/937,556.
United States Patent and Trademark Office, Office Action dated Apr. 8, 2019, in U.S. Appl. No. 15/937,556.
United States Patent and Trademark Office, Notice of Allowance dated Sep. 30, 2019, in U.S. Appl. No. 15/937,556.

* cited by examiner

SYSTEMS AND METHODS FOR DISCHARGING AN AC INPUT CAPACITOR WITH AUTOMATIC DETECTION

1. CROSS-REFERENCES TO RELATED APPLICATIONS

This application is a continuation of U.S. patent application Ser. No. 15/835,232, filed Dec. 7, 2017, which is a continuation of U.S. patent application Ser. No. 15/089,231, filed Apr. 1, 2016, which is a continuation of U.S. patent application Ser. No. 13/367,097, filed Feb. 6, 2012, which claims priority to U.S. Provisional Application No. 61/443,637, filed Feb. 16, 2011, commonly assigned, all of the above-referenced applications being incorporated by reference herein for all purposes.

Additionally, this application is related to U.S. patent application Ser. No. 12/892,580, filed Sep. 28, 2010, which is incorporated by reference herein for all purposes.

2. BACKGROUND OF THE INVENTION

The present invention is directed to integrated circuits. More particularly, the invention provides systems and methods for discharging a capacitor with automatic detection. Merely by way of example, the invention has been applied to a power converter. But it would be recognized that the invention has a much broader range of applicability.

Power converters have been widely used for consumer electronics such as portable devices. The power converters can convert electric power from one form to another. As an example, the electric power is transformed from alternate current (AC) to direct current (DC), from DC to AC, from AC to AC, or from DC to DC. Additionally, the power converters can also convert the electric power from one voltage level to another voltage level. Specifically, the power converters include linear converters and switch-mode converters. The switch-mode converters often use pulse-width-modulated (PWM) or pulse-frequency-modulated (PFM) mechanisms. The switch-mode converters usually are more efficient than the linear converters.

FIG. 1 is a simplified conventional diagram showing a switch-mode power conversion system with an AC input resistor and an AC input capacitor. The switch-mode power conversion system 100 includes an alternating current (AC) input resistor 120 (e.g., an X-resistor), an AC input capacitor 110 (e.g., an X-capacitor), input terminals 122 and 124, a switch-mode controller 130, a primary winding 172, a secondary winding 174, an auxiliary winding 176, and a switch 180.

As shown in FIG. 1, the switch-mode power conversion system 100 includes the AC input capacitor 110 that is connected to the input terminals 122 and 124. The AC input capacitor 110 often is used to address the issue of electromagnetic interference (EMI). Additionally, to comply with some safety requirements, the voltage across the AC input capacitor 110 needs to drop below a predetermined threshold (e.g., direct current 60V) in a short time period (e.g., within 1 second) after the input terminals 122 and 124 are disconnected from an AC power supply. To facilitate the discharge of the AC input capacitor 110, the power conversion system 100 also includes the AC input resistor 120 that is connected to the AC input capacitor 110 in parallel.

But the AC input resistor 120 also consumes power when the power supply for AC input voltage is not disconnected and thus causes the standby power consumption of the power conversion system 100 to rise. For example, if the AC input resistor 120 has a resistance of 3 MΩ, then, with a 264-volt AC input voltage, the power consumption of the resistor 120 is about 23 mW.

As shown in FIG. 1, after the input terminals 122 and 124 are disconnected from the AC power supply, the charges accumulated on the AC input capacitor 110 are released through the AC input resistor 120. For example, the voltage across the AC input capacitor 110 decreases with time as follows.

$$V_{xc}(t) = V_0 \times e^{-\left(\frac{t}{R_x C_x}\right)} \quad \text{(Equation 1)}$$

where $V_{xc}$ is the voltage across the AC input capacitor 110, and $V_0$ is the voltage value of $V_{xc}$ at the time when the input terminals 122 and 124 are disconnected from the AC power supply. $R_x$ and $C_x$ are the resistance value and the capacitance value of the AC input resistor 120 and the AC input capacitor 110 respectively.

As an example, in order for $V_{xc}$ to drop approximately by a factor of e within one second, the resistance of the AC input resistor 120 satisfies the following equation.

$$R_x \approx \frac{1}{C_x} \quad \text{(Equation 2)}$$

Usually, the magnitude of $C_x$ depends on the power of the switch-mode power conversion system 100 and the solution to electromagnetic interference. If the capacitance of the AC input capacitor 110 is increased, the resistance of the AC input resistor 120 would become smaller according to Equation 2 and the AC input resistor 120 may consume more power.

Hence it is highly desirable to improve the techniques of discharging the AC input capacitor in order to reduce the power loss.

3. BRIEF SUMMARY OF THE INVENTION

The present invention is directed to integrated circuits. More particularly, the invention provides systems and methods for discharging a capacitor with automatic detection. Merely by way of example, the invention has been applied to a power converter. But it would be recognized that the invention has a much broader range of applicability.

According to one embodiment, a system for discharging a capacitor includes a signal detector and a discharge control component. The signal detector is configured to receive an input signal and generate a detection signal based on at least information associated with the input signal, the input signal being associated with an alternate current signal received by a capacitor including a first capacitor terminal and a second capacitor terminal. A discharge control component is configured to receive at least the detection signal and generate an output signal to discharge the capacitor if the detection signal satisfies one or more conditions.

According to another embodiment, a system for detecting an input signal includes a comparator, a pulse generator, and a detection component. The comparator is configured to receive an input signal and a threshold signal and generate a comparison signal based on at least information associated with the input signal and the threshold signal. The pulse generator is configured to generate a pulse signal based on at least information associated with the comparison signal.

The detection component is configured to receive the pulse signal and generate a detection signal based on at least information associated with the pulse signal. The comparator is further configured to change the comparison signal from a first logic level to a second logic level if the input signal changes from a first input value larger than the threshold signal to a second input value smaller than the threshold signal. In addition, the comparator is configured to change the comparison signal from the second logic level to the first logic level if the input signal changes from a third input value smaller than the threshold signal to a fourth input value larger than the threshold signal. The pulse generator is further configured to generate a pulse if the comparison signal is changed from the first logic level to the second logic level or if the comparison signal is changed from the second logic level to the first logic level. Furthermore, the detection component is further configured to change the detection signal from a third logic level to a fourth logic level if no pulse is generated by the pulse generator for a predetermined time period.

According to yet another embodiment, a system for discharging a device includes a first transistor including a first transistor terminal, a second transistor terminal and a third transistor terminal, a second transistor including a fourth transistor terminal, a fifth transistor terminal and a sixth transistor terminal, a third transistor including a seventh transistor terminal, an eighth transistor terminal and a ninth transistor terminal, and a fourth transistor including a tenth transistor terminal, an eleventh transistor terminal and a twelfth transistor terminal. The second transistor terminal is connected to the fourth transistor terminal. The fifth transistor terminal is connected to the seventh transistor terminal. The eighth transistor terminal is connected to the eleventh terminal and configured to receive an input signal. Additionally, the system is further configured to, if the input signal satisfies one or more conditions, turn on the first transistor and the fourth transistor, and discharge the device through at least the first transistor and the fourth transistor.

In one embodiment, a system for detecting an input signal includes a signal detector, a comparator, a first pulse generator, and a detection component. The signal detector is configured to sample an input signal and generate one or more sampled signals including a first sampled signal. The comparator is configured to receive the one or more sampled signals and a threshold signal and generate a comparison signal based on at least information associated with the one or more sampled signals and the threshold signal. The first pulse generator is configured to generate a first pulse signal based on at least information associated with the comparison signal. The detection component is configured to receive the first pulse signal and generate a detection signal based on at least information associated with the first pulse signal. The comparator is further configured to, if the first sampled signal is smaller than the threshold signal, generate the comparison signal at a first logic level. Additionally, the comparator is configured to, if the first sampled signal is larger than the threshold signal, generate the comparison signal at a second logic level. Moreover, the first pulse generator is further configured to generate a pulse if the comparison signal is changed from the first logic level to the second logic level or if the comparison signal is changed from the second logic level to the first logic level. The detection component is further configured to change the detection signal from a third logic level to a fourth logic level if no pulse is generated by the first pulse generator for a predetermined time period.

In another embodiment, a system for detecting an input signal and discharging a device includes a first transistor including a first transistor terminal, a second transistor terminal and a third transistor terminal, a second transistor including a fourth transistor terminal, a fifth transistor terminal and a sixth transistor terminal, and a third transistor including a seventh transistor terminal, an eighth transistor terminal and a ninth transistor terminal. The system further includes a first resistor including a first resistor terminal and a second resistor terminal, and a second resistor including a third resistor terminal and a fourth resistor terminal. The third transistor terminal is connected, directly or indirectly, to the fourth transistor terminal. The third transistor terminal is connected, directly or indirectly, to the first resistor terminal. The second resistor terminal is connected to the third resistor terminal. The fourth resistor terminal is connected to the seventh transistor terminal. The first transistor terminal is configured to receive an input signal. The second transistor terminal is configured to receive a first drive signal. The fifth transistor terminal is configured to receive a second drive signal. Moreover, the eighth transistor terminal is configured to receive a third drive signal. The system is further configured to, if the first drive signal satisfies one or more first conditions and the second drive signal satisfies one or more second conditions, turn on the first transistor and the second transistor, and discharge the device through at least the first transistor and the second transistor. In addition, the system is further configured to, if the first drive signal satisfies the one or more first conditions and the third drive signal satisfies one or more third conditions, turn on the first transistor and the third transistor, and generate an output signal based on at least information associated with the input signal.

In yet another embodiment, a system for detecting an input signal includes a signal detector, a comparator, a counting component, and a detection component. The signal detector is configured to sample an input signal at a plurality of times during a first predetermined time period and generate a plurality of sampled signals corresponding to the plurality of times respectively, the plurality of times including a first time and a second time immediately after the first time, the plurality of sampled signals including a first sampled signal corresponding to the first time and a second sampled signal corresponding to the second time. The comparator is configured to receive the plurality of sampled signals and generate a comparison signal based on at least information associated with the plurality of sampled signals. The counting component is configured to receive at least the comparison signal and change a value based on at least information associated with the comparison signal. The detection component is configured to generate a detection signal based on at least information associated with the value. The comparator is further configured to, if the first sampled signal is smaller than the second sampled signal, generate the comparison signal at a first logic level. Additionally, the comparator is configured to, if the first sampled signal is larger than the second sampled signal, generate the comparison signal at the second logic level. The counting component is further configured to increase the value by a first predetermined magnitude if the comparison signal is at the first logic level, and decrease the value by a second predetermined magnitude if the comparison signal is at the second logic level. The detection component is further configured to change the detection signal from a third logic level to a fourth logic level if the value is larger than a first threshold or smaller than a second threshold after the first predetermined time period.

Many benefits are achieved by way of the present invention over conventional techniques. Certain embodiments of the present invention provide a system and method for automatically detecting the AC input voltage, and if appropriate, in response, quickly discharging the AC input capacitor. For example, the system and method can reduce the power consumption (e.g., standby power consumption) of the power conversion system. In another example, the system and method does not need to use the AC input resistor.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides systems and methods for discharging a capacitor with automatic detection. Merely by way of example, the invention has been applied to a power converter. But it would be recognized that the invention has a much broader range of applicability.

Figure 1:
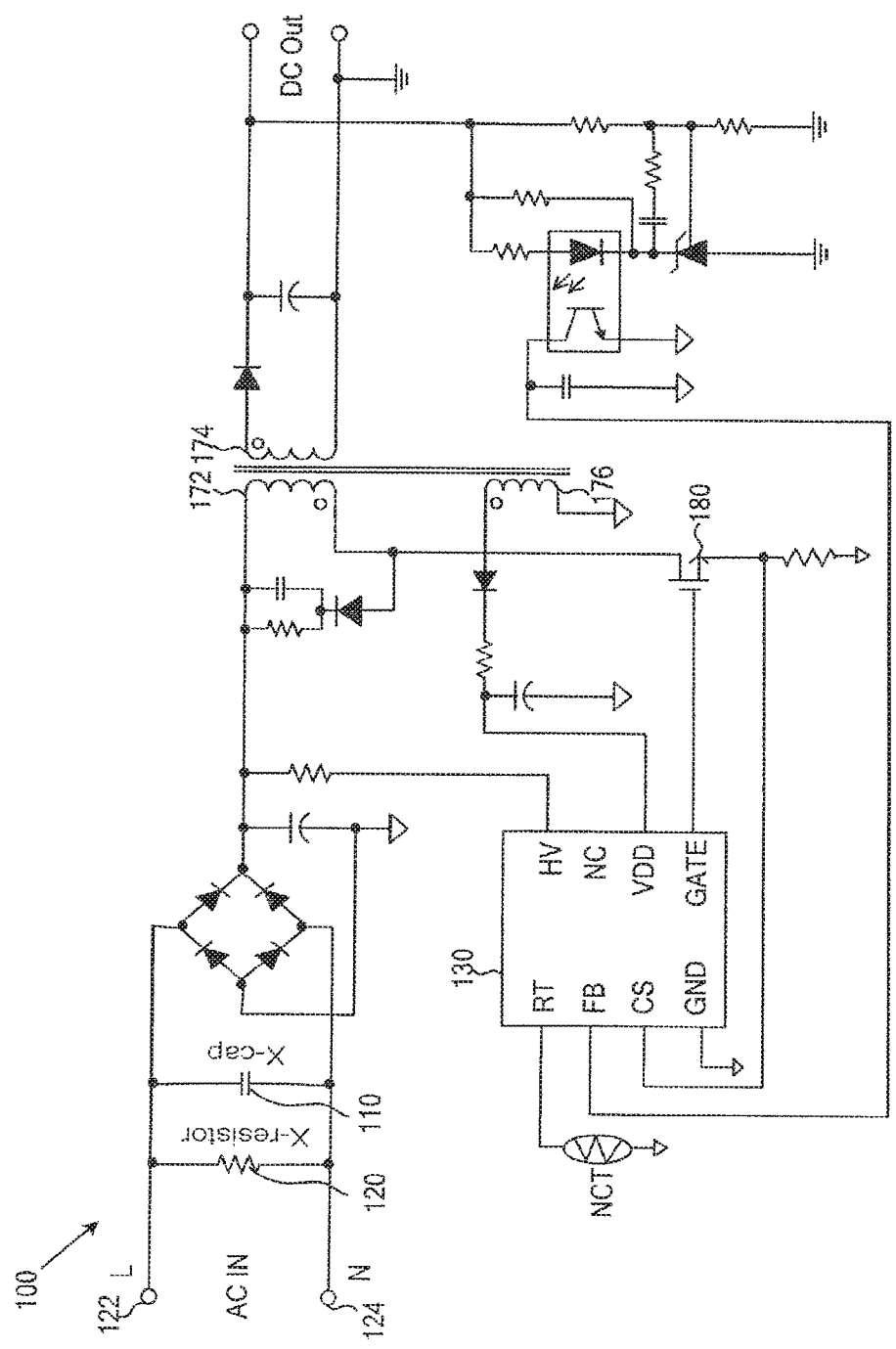
FIG. 1 is a simplified conventional diagram showing a switch-mode power conversion system with an AC input resistor and an AC input capacitor.
Figure 2:
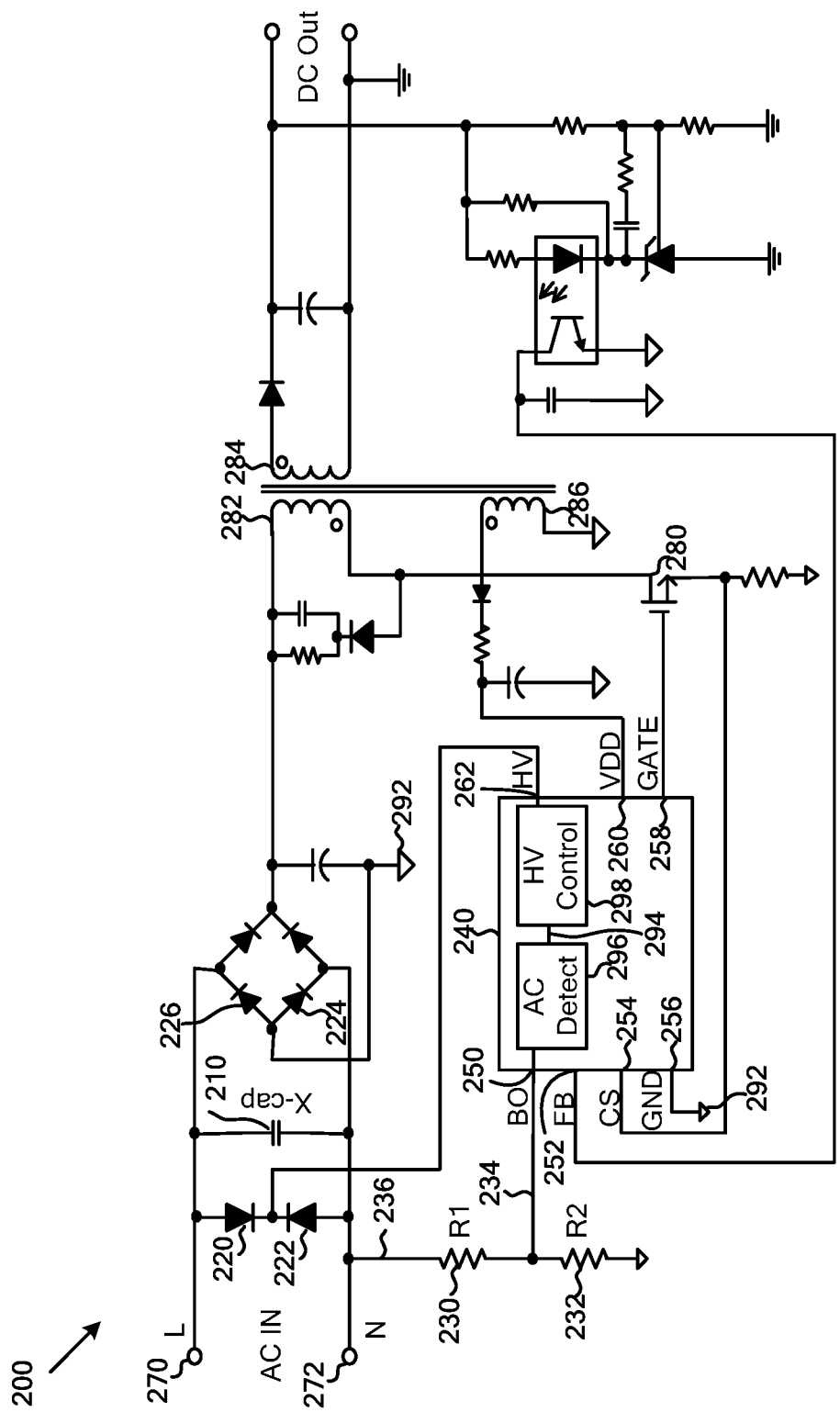
FIG. 2 is a simplified diagram showing a switch-mode power conversion system according to an embodiment of the present invention.

FIG. 2 is a simplified diagram showing a switch-mode power conversion system according to an embodiment of the present invention. This diagram is merely an example, which should not unduly limit the scope of the claims. One of ordinary skill in the art would recognize many variations, alternatives, and modifications.

The power conversion system 200 includes AC input terminals 270 and 272, an AC input capacitor 210, diodes 220 and 222, resistors 230 and 232, a controller 240, a primary winding 282, a secondary winding 284, an auxiliary winding 286, and a switch 280. The power conversion system 200 further includes diodes 224 and 226. For example, the controller 240 is a chip that includes terminals 250, 252, 254, 256, 258, 260, and 262. In another example, the controller 240 includes an AC detection component 296 and a voltage control component 298. In yet another example, the terminal 256 (e.g., GND) is biased at a chip-ground voltage 292. In yet another example, an anode terminal of the diode 224 is biased at the chip-ground voltage 292. In yet another example, an anode terminal of the diode 226 is biased at the chip-ground voltage 292.

In one embodiment, a voltage divider that includes the resistors 230 and 232 receives a signal 236 from an AC input terminal 272 (or an AC input terminal 270) and outputs a signal 234. For example, the AC detection component 296 receives the signal 234 through the terminal 250 (e.g., terminal BO) and outputs a signal 294 to the voltage control component 298. In another example, if the signal 294 indicates that the AC input terminals 270 and 272 are disconnected from an AC power supply, the voltage control component 298 discharges the AC input capacitor 210 through the diode 220 or the diode 222 in combination with other internal circuit components of the controller 240.

The resistance values of the resistors 230 and 232 can be made large and the power consumption of the resistors 230 and 232 can thus be reduced according to certain embodiments. For example, if the resistance value of the resistor 230 is 40 MΩ and the resistance value of the resistor 232 is 300 KΩ, the power consumption of the resistors 230 and 232, with a 264-volt AC input voltage, is about 1.7 mW, which is much lower than the power consumption of 23 mW for the AC input resistor 120 as discussed above.

Figure 3:
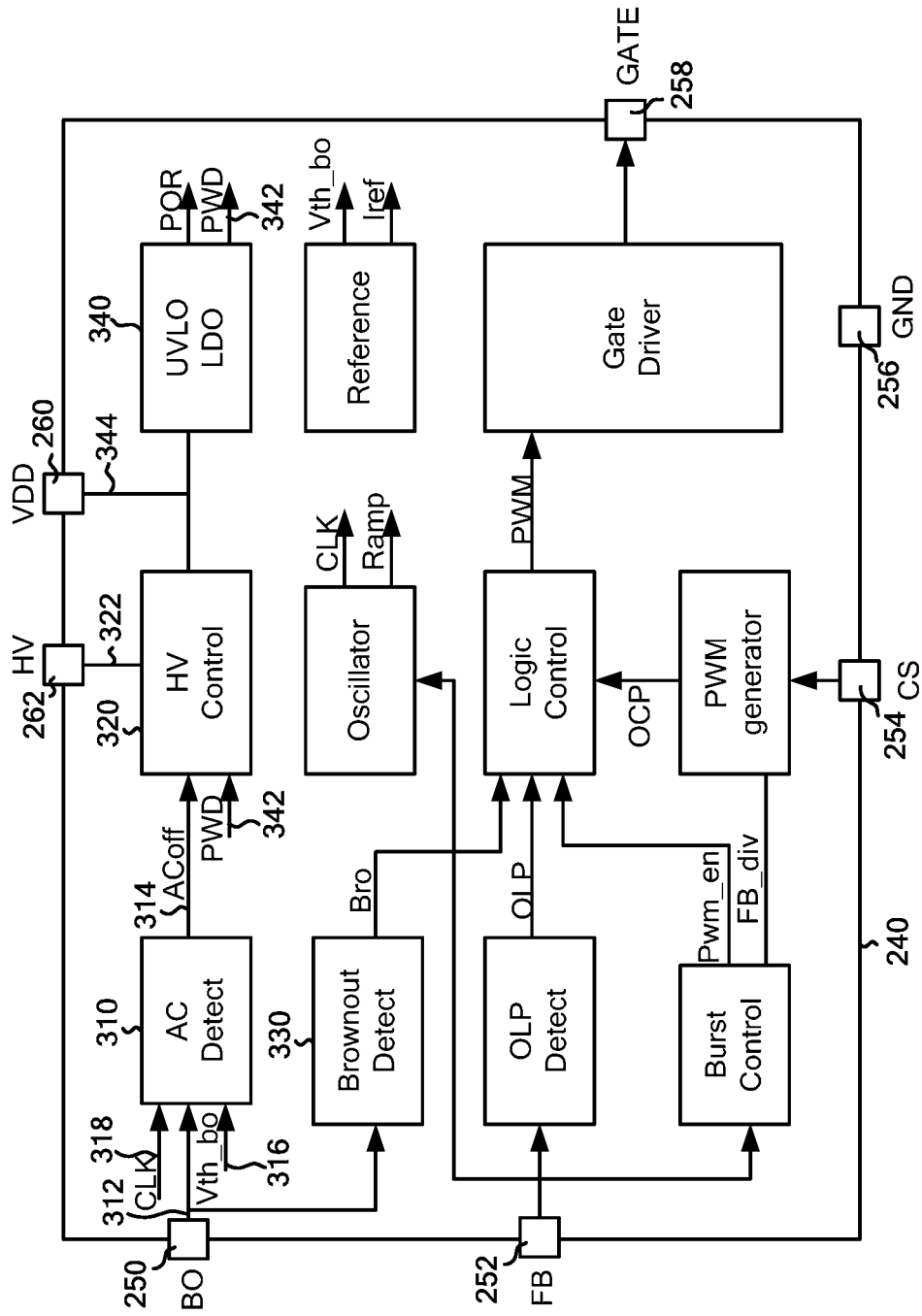
FIG. 3 is a simplified diagram showing a controller for the switch-mode power conversion system of FIG. 2 according to an embodiment of the present invention.

FIG. 3 is a simplified diagram showing the controller 240 for the switch-mode power conversion system 200 according to an embodiment of the present invention. This diagram is merely an example, which should not unduly limit the scope of the claims. One of ordinary skill in the art would recognize many variations, alternatives, and modifications. The controller 240 includes at least an AC detection component 310, a voltage control component 320, a brownout detection component 330, and an under-voltage-lockout (UVLO) component 340. For example, the AC detection component 310 and the voltage control component 320 are the same as the AC detection component 296 and the voltage control component 298, respectively.

In one embodiment, the AC detection component 310 receives at least a signal 312 through the terminal 250 (e.g., terminal BO) and a threshold signal 316 (e.g., $V_{th\_bo}$). For example, the AC detection component 310 compares the signal 312 with the threshold signal 316, and outputs a detection signal 314 (e.g., ACoff). In another example, if the magnitude of the signal 312 crosses over the threshold 316 (e.g., $V_{th\_bo}$) periodically, the AC input terminals 270 and 272 are not disconnected from the AC power supply. In yet another example, if the magnitude of the signal 312 does not cross over the threshold 316 (e.g., $V_{th\_bo}$) for a predetermined period of time, it is recognized that the AC input terminals 270 and 272 are disconnected from the AC power supply. In yet another example, the detection signal 314 (e.g., ACoff) is at a logic high level if the AC input terminals 270 and 272 are disconnected from the AC power supply, and is at a logic low level if the AC input terminals 270 and 272 are not disconnected from the AC power supply. In yet another example, the signal 312 is associated with an input signal (e.g., an AC input voltage) received at the AC input terminals 270 and 272. In yet another example, the threshold signal 316 is much larger than zero in magnitude. In yet another example, the threshold signal 316 has a low magnitude (e.g., close to zero). In yet another example, the signal 312 is the same as the signal 234. In yet another example, the signal 314 is the same as the signal 294.

In another embodiment, the UVLO component 340 receives a signal 344 through the terminal 260 (e.g., terminal VDD) and outputs at least a signal 342 (e.g., PWD). For example, if the signal 344 is larger than a predetermined threshold in magnitude, the signal 342 (e.g., PWD) is at a logic high level. In another example, if the signal 344 is lower than the predetermined threshold in magnitude, the signal 342 (e.g., PWD) is at a logic low level.

In yet another embodiment, the voltage control component 320 receives the detection signal 314 and the signal 342 (e.g., PWD) and outputs a signal 322. In another example, if the detection signal 314 is at the logic high level and the signal 342 (e.g., PWD) is at the logic low level, the voltage control component 320 discharges the AC input capacitor 210 by reducing the voltage level of the signal 322 through the terminal 262 (e.g., terminal HV). In another example, if the signal 342 (e.g., PWD) is at the logic high level and/or the detection signal 314 (e.g., ACoff) is at the logic low level, the voltage control component 320 does not discharge the AC input capacitor 210 by reducing the voltage level of the signal 322 through the terminal 262 (e.g., terminal HV). In yet another embodiment, the AC detection component 310 shares the same terminal 250 with the brownout detection component 330, without requiring any additional terminal for the controller chip.

Figure 4:
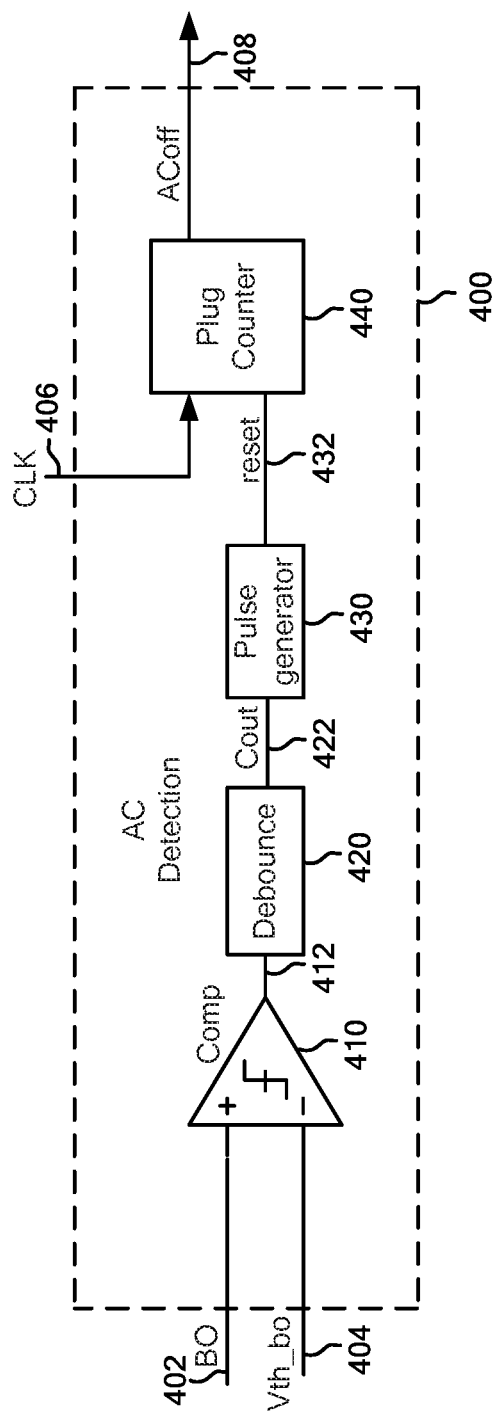
FIG. 4 is a simplified diagram showing an AC detection component as part of the controller for the switch-mode power conversion system of FIG. 2 according to an embodiment of the present invention.

FIG. 4 is a simplified diagram showing an AC detection component according to an embodiment of the present invention. This diagram is merely an example, which should not unduly limit the scope of the claims. One of ordinary skill in the art would recognize many variations, alternatives, and modifications. The AC detection component 400 includes a comparator 410, a debounce component 420, a pulse generator 430, and a counter 440. For example, the AC detection component 400 is the same as the AC detection component 310. In another example, the AC detection component 400 is used to replace the AC detection component 296 in FIG. 2.

In one embodiment, the comparator 410 receives and compares a signal 402 (e.g., BO) and a threshold signal 404 (e.g., $V_{th\_bo}$), and in response, outputs a comparison signal 412 to the debounce component 420. In another example, if the magnitude of the signal 402 crosses over the threshold 404 (e.g., $V_{th\_bo}$) periodically, the AC input terminals 270 and 272 are not disconnected from the AC power supply. In yet another example, if the magnitude of the signal 402 does not cross over the threshold 404 (e.g., $V_{th\_bo}$) for a predetermined period of time, the AC input terminals 270 and 272 are disconnected from the AC power supply. In yet another example, the signal 402 is the same as the signal 312. In yet another example, the signal 404 is the same as the signal 316.

In another embodiment, the debounce component 420 generates a signal 422 (e.g., the Cout signal), which is received by the pulse generator 430. For example, the pulse generator 430, in response, outputs a signal 432 (e.g., the reset signal) to the counter 440. In another example, the counter 440 also receives a clock signal 406 and generates a detection signal 408 (e.g., ACoff). In yet another example, the detection signal 408 (e.g., ACoff) is at a logic high level if the AC input terminals 270 and 272 are disconnected from the AC power supply, and is at a logic low level if the AC input terminals 270 and 272 are not disconnected from the AC power supply. In yet another example, the signal 402 is associated with an input signal (e.g., an AC input voltage) received at the AC input terminals 270 and 272. In yet another example, the threshold signal 404 is much larger than zero in magnitude. In yet another example, the threshold signal 404 has a low magnitude (e.g., close to zero). In some embodiments, the debounce component 420 is omitted and thus the signal 412 is the same as the signal 422. In yet another example, the signal 406 is the same as the signal 318. In yet another example, the signal 408 is the same as the signal 314.

Figure 5:
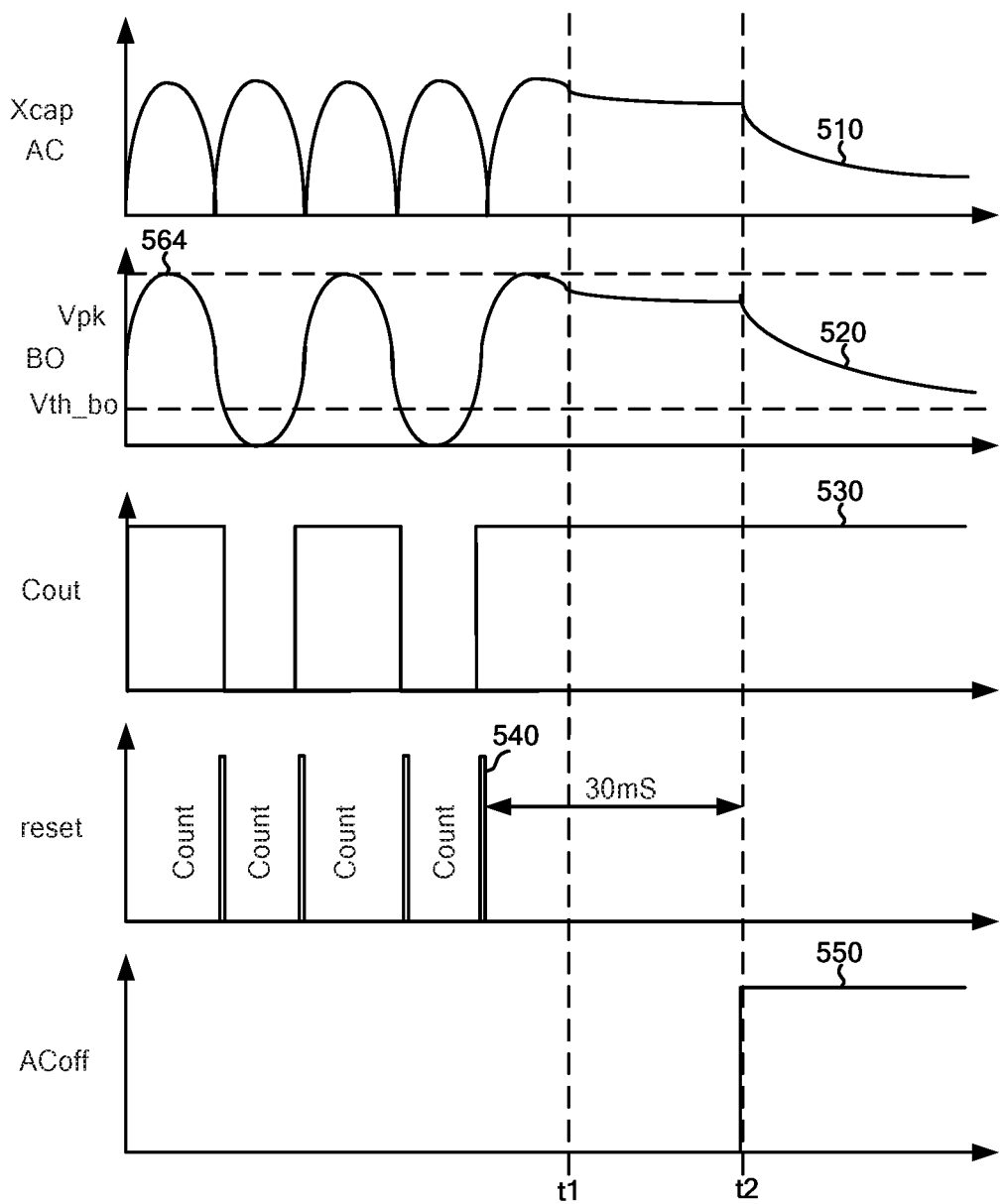
FIG. 5 is a simplified timing diagram for generating a detection signal by the AC detection component of FIG. 4 as part of the controller for the switch-mode power conversion system of FIG. 2 according to an embodiment of the present invention.

FIG. 5 is a simplified timing diagram for generating the detection signal 408 by the AC detection component 400 according to an embodiment of the present invention. This diagram is merely an example, which should not unduly limit the scope of the claims. One of ordinary skill in the art would recognize many variations, alternatives, and modifications.

The waveform 510 represents an AC voltage across the AC input capacitor 210 as a function of time, the waveform 520 represents the signal 402 as a function of time, and the waveform 530 represents the signal 422 as a function of time. Additionally, the waveform 540 represents the signal 432 as a function of time, and the waveform 550 represents the detection signal 408 as a function of time.

In one embodiment, the signal 422 (e.g., corresponding to the waveform 530) is at a logic high level if the signal 402 (e.g., corresponding to the waveform 520) is higher than the threshold signal 404 (e.g., $V_{th\_bo}$) in magnitude, and the signal 422 (e.g., corresponding to the waveform 530) is at a logic low level if the signal 402 (e.g., corresponding to the waveform 520) is lower than the threshold signal 404 (e.g., $V_{th\_bo}$) in magnitude. In another example, the pulse generator 430 detects rising edges and falling edges of the signal 422 (e.g., corresponding to the waveform 530), and in response generates pulses for the signal 432 (e.g., corresponding to the waveform 540). In yet another example, the counter 440 is reset by the pulses of the signal 432 (e.g., corresponding to the waveform 540) and counts the lapse of time since the last reset. According to one embodiment, if the lapse of time since the last reset reaches a predetermined value (e.g., 30 ms), the counter 440 generates the detection signal 408 (e.g., corresponding to the waveform 550 and changing to the logic high level at time $t_2$) to indicate the AC input terminals 270 and 272 are no longer provided with an AC input voltage. According to another embodiment, the AC input terminals 270 and 272 stop being provided with the AC input voltage at time $t_1$ as shown in FIG. 5. For example, the signal 402 has a peak magnitude 564 which is much larger than the threshold signal 404 in magnitude.

Figure 6:
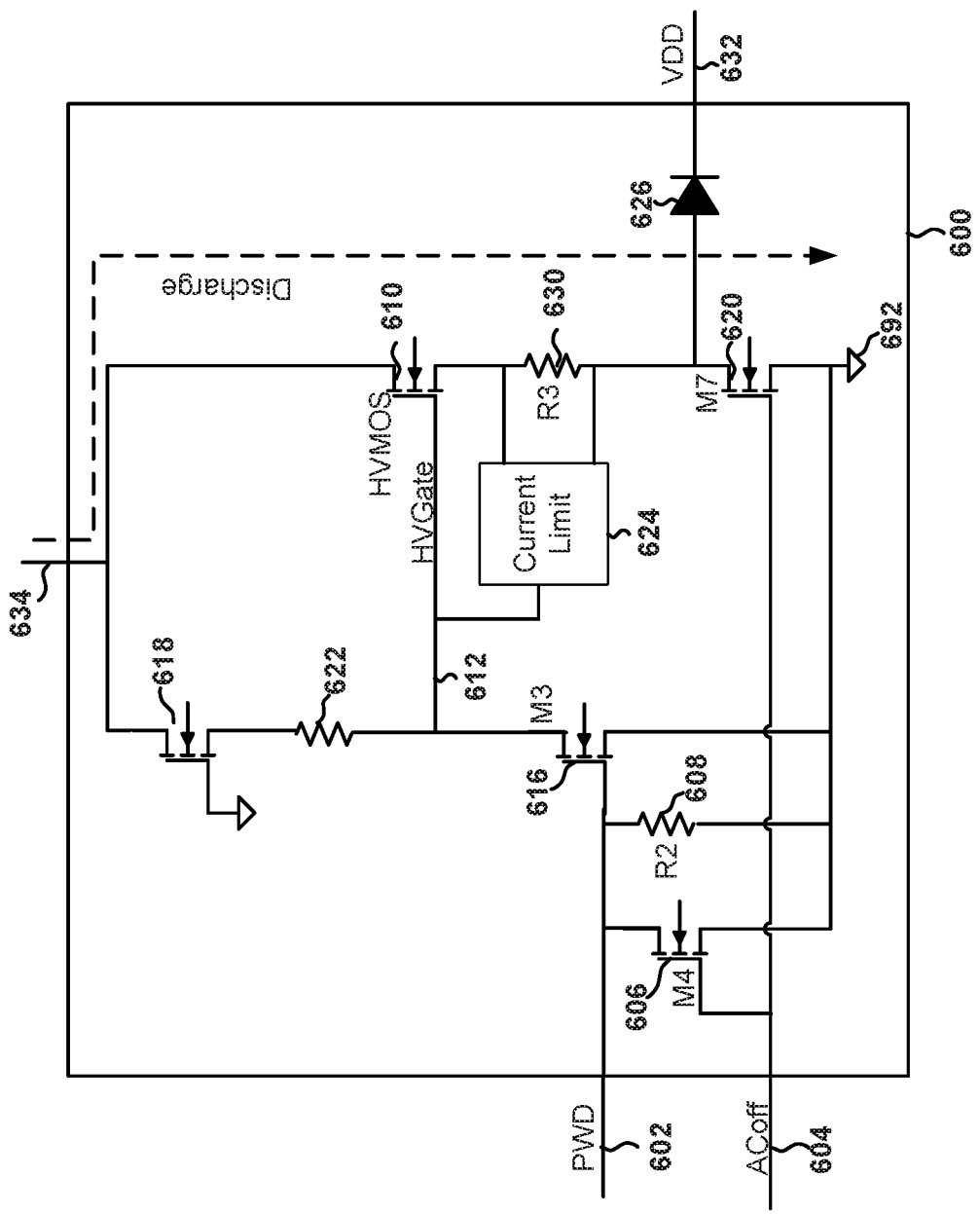
FIG. 6 is a simplified diagram showing a voltage control component as part of the controller for the switch-mode power conversion system of FIG. 2 according to an embodiment of the present invention.

FIG. 6 is a simplified diagram showing a voltage control component according to an embodiment of the present invention. This diagram is merely an example, which should not unduly limit the scope of the claims. One of ordinary skill in the art would recognize many variations, alternatives, and modifications. The voltage control component 600 includes transistors 606, 610, 616 and 620 and a resistor 630. The voltage control component 600 further includes resistors 608, 622 and 630, and a current-limit component 624. For example, the voltage control component 600 is the same as the voltage control component 320. In another example, the voltage control component 600 is used to replace the voltage control component 298 in FIG. 2.

In one embodiment, the transistor 610 is a MOS transistor that sustains a high voltage (e.g., 600 volts). For example, the transistor 610 is an N-channel MOS field effect transistor. In another example, the transistor 606 is an N-channel field effect transistor and a source terminal of the transistor 606 is biased at a chip-ground voltage 692. In yet another example, the transistor 616 is an N-channel field effect transistor and a source terminal of the transistor 616 is biased at the chip-ground voltage 692. In yet another example, the transistor 620 is an N-channel field effect transistor and a source terminal of the transistor 620 is biased at the chip-ground voltage 692. In yet another example, a drain terminal of the transistor 606 is connected to a gate terminal of the transistor 616. In yet another example, a drain terminal of the transistor 616 is connected to a gate terminal 610. In yet another example, the resistor 630 is connected between a source terminal of the transistor 610 and a drain terminal of the transistor 620. In yet another example, an anode terminal of the diode 626 is connected to the drain terminal of the transistor 620, and a signal 632 is applied to a cathode terminal of the diode 626. In yet another example, the chip-ground voltage 692 is the same as the chip-ground voltage 292.

As shown in FIG. 6, the voltage control component 600 receives at least a detection signal 604 (e.g., ACoff) and a signal 602 (e.g., PWD) according to one embodiment. For example, the detection signal 604 (e.g., ACoff) is at a logic high level if the AC input terminals 270 and 272 are disconnected from the AC power supply, and is at a logic low level if the AC input terminals 270 and 272 are not disconnected from the AC power supply. In another example, the signal 602 (e.g., PWD) is associated with a signal 632 (e.g., VDD) that is applied to the terminal 260. In yet another example, the signal 602 (e.g., PWD) is at a logic high level if the signal 632 is larger than a predetermined threshold in magnitude, and is at a logic low level if the signal 632 (e.g., VDD) is lower than the predetermined threshold in magnitude. In yet another example, the signal 602 is the same as the signal 342. In yet another example, the signal 604 is the same as the signal 312.

According to another embodiment, if the detection signal 604 (e.g., ACoff) is at the logic low level, the transistors 606 and 620 are turned off. For example, if the signal 602 (e.g., PWD) is at the logic high level, the transistor 616 is turned on. In another example, a gate signal 612 is pulled down and the transistor 610 is turned off. In yet another example, the transistor 618 is used as a large resistor.

According to yet another embodiment, if the detection signal 604 (e.g., ACoff) is at the logic high level and the signal 602 (e.g., PWD) is at the logic low level, the transistor 616 is turned off and the gate signal 612 is raised. For example, the transistors 610 and 620 are turned on by the signals 612 and 604, respectively. In another example, the AC input capacitor 210 is discharged through the transistors 610 and 620 and the resistor 630. In yet another example, when both the transistors 610 and 620 are turned on, the AC input capacitor 210 is discharged by reducing the voltage level of a signal 634 through the terminal 262 (e.g., HV). In yet another example, the current-limit component 624 detects a current flowing through the resistor 630 and operates to reduce the current if it is larger than a threshold in magnitude. In yet another example, the discharging current on the discharging path is at a predetermined level, e.g., 3 mA. In yet another example, the signal 634 is the same as the signal 322.

Figure 7:
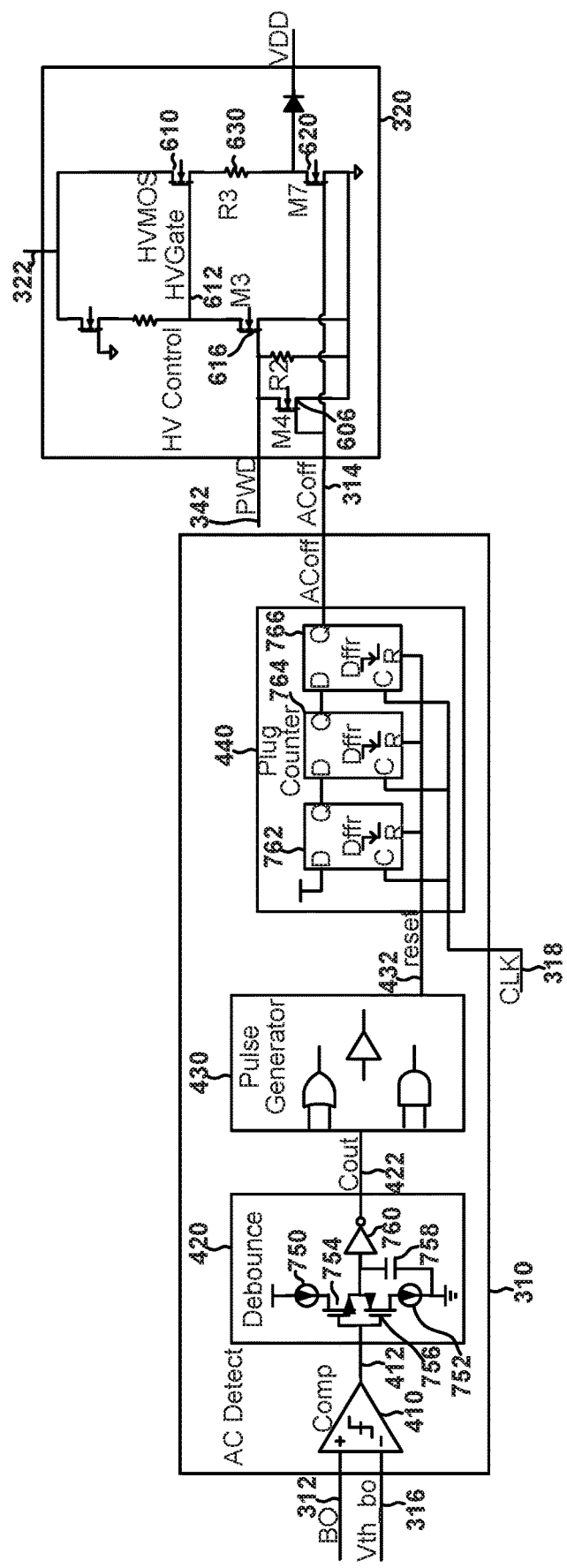
FIG. 7 is a simplified diagram showing the AC detection component of FIG. 4 and the voltage control component of FIG. 6 as parts of the controller for the switch-mode power conversion system of FIG. 2 according to another embodiment of the present invention.

FIG. 7 is a simplified diagram showing the AC detection component 310 and the voltage control component 320 as parts of the controller 240 for the switch-mode power conversion system 200 according to an embodiment of the present invention. This diagram is merely an example, which should not unduly limit the scope of the claims. One of ordinary skill in the art would recognize many variations, alternatives, and modifications. The AC detection component 310 includes the comparator 410, the debounce component 420, the pulse generator 430, and the counter 440. The debounce component 420 is omitted in some embodiments. The voltage control component 320 includes transistors 606, 610, 616 and 620 and a resistor 630.

For example, the debounce component 420 includes two current sources 750 and 752, two transistors 754 and 756, a capacitor 758 and an inverter 760. In another example, the counter 440 includes three D flip-flops 762, 764 and 766.

Figure 8:
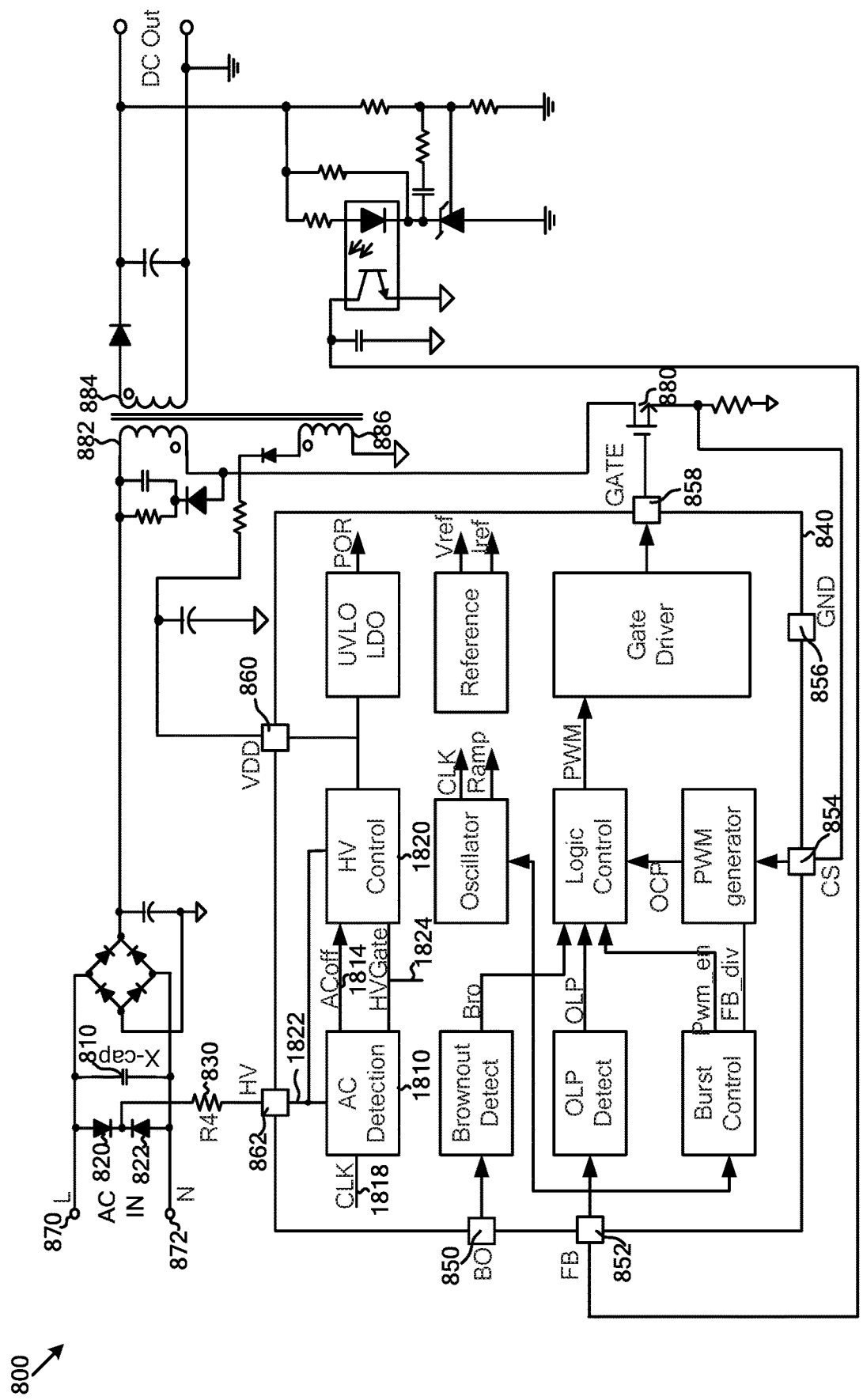
FIG. 8 is a simplified diagram showing a switch-mode power conversion system according to another embodiment of the present invention.

FIG. 8 is a simplified diagram showing a switch-mode power conversion system according to another embodiment of the present invention. This diagram is merely an example, which should not unduly limit the scope of the claims. One of ordinary skill in the art would recognize many variations, alternatives, and modifications. For example, the power conversion system 800 includes an AC input capacitor 810, diodes 820 and 822, a resistor 830, a controller 840, a primary winding 882, a secondary winding 884, an auxiliary winding 886, and a switch 880. In another example, the controller 840 is a chip that includes terminals 850, 852, 854, 856, 858, 860, and 862. In yet another example, the controller 840 includes at least an AC detection component 1810 and a voltage control component 1820.

According to one embodiment, the AC detection component 1810 receives a signal 1822 through the resistor 830 and the terminal 862, and receives a clock signal 1818 and a gate control signal 1824. For example, in response, the AC detection component 1810 determines whether the AC amplitude of the signal 1822 is nearly zero and, in response, outputs the detection signal 1814 (e.g., the ACoff signal) to indicate whether the AC amplitude of the signal 1822 is nearly zero. In another example, the voltage control component 1820 receives the detection signal 1814, and if the detection signal 1814 indicates the AC amplitude of the signal 1822 is nearly zero (e.g., the signal 1822 being nearly a DC signal), discharges the AC input capacitor 810 by reducing the voltage level of the signal 1822 through the terminal 862.

Figure 9:
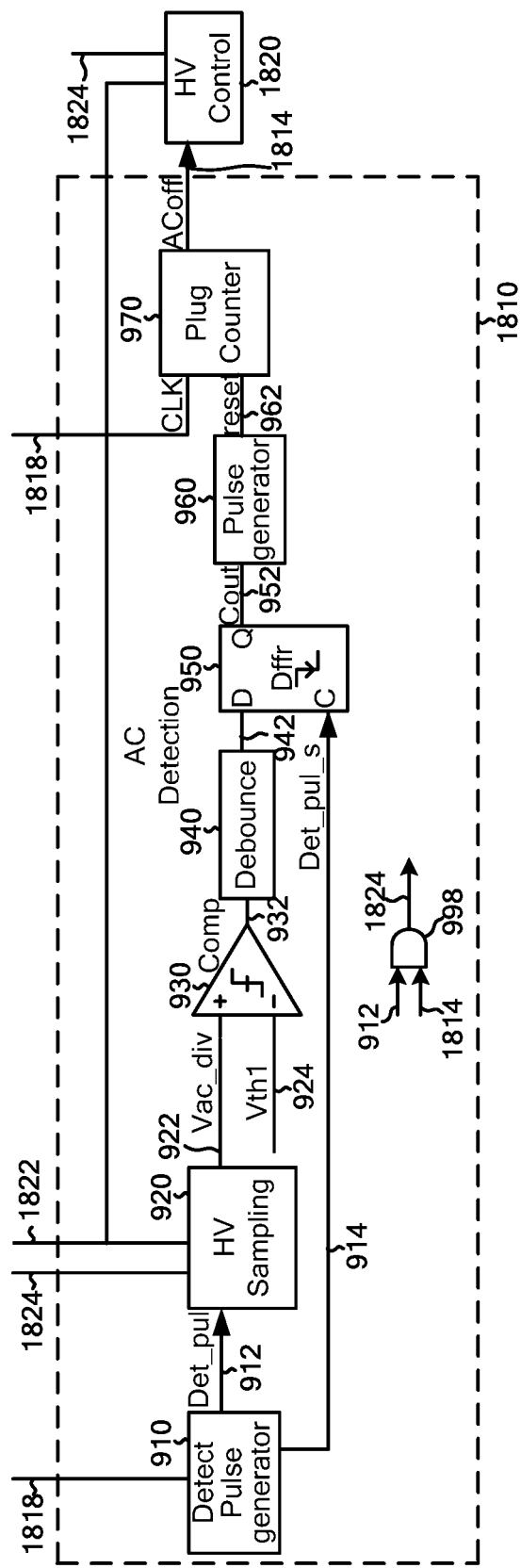
FIG. 9 is a simplified diagram showing an AC detection component as part of the controller for the switch-mode power conversion system of FIG. 8 according to an embodiment of the present invention.

FIG. 9 is a simplified diagram showing the AC detection component 1810 as part of the controller 840 for the switch-mode power conversion system 800 according to an embodiment of the present invention. This diagram is merely an example, which should not unduly limit the scope of the claims. One of ordinary skill in the art would recognize many variations, alternatives, and modifications. The AC detection component 1810 includes a pulse generator 910, a sampling component 920, a comparator 930, a debounce component 940, a flip-flop component 950, a pulse generator 960, and a counter 970.

According to one embodiment, the pulse generator 910 of the AC detection component 1810 receives the clock signal 1818 and outputs a pulse signal 912 to the sampling component 920. For example, the sampling component 920 also receives the gate control signal 1824, samples the signal 1822 (e.g., sampling 10 times within each AC period), and generates a sampled signal 922. In another example, the sampled signal 922 is received by the comparator 930.

According to another embodiment, the comparator 930 compares the sampled signal 922 with a threshold signal 924 (e.g., $V_{th1}$) and outputs a comparison signal 932 to the debounce component 940. For example, if the AC input terminals 870 and 872 are provided with an AC input voltage, the comparison signal 932 changes back and forth between the logic high level and the logic low level for several times (e.g., 4 times) within each AC period (e.g., 20 ms). In another example, if the comparison signal 932 does not change within a predetermined period of time (e.g., 30 ms), the AC input terminals 870 and 872 are determined to be no longer provided with the AC input voltage.

According to yet another embodiment, the debounce component 940 in response outputs a signal 942 to the flip-flop component 950. For example, the flip-flop component also receives a pulse signal 914 from the pulse generator 910. In another example, the flip-flop component 950 sends a signal 952 (e.g., the Cout signal) to the pulse generator 960, which in response generates a pulse signal 962 (e.g., the reset signal). In yet another example, the pulse signal 962 is received by the counter 970, which also receives the clock signal 1818 and generates the detection signal 1814. In yet another example, an AND gate 998 receives the detection signal 1814 and the pulse signal 912 and outputs the gate control signal 1824. In another example, the AND gate 998 is included in the AC detection component 1810. In yet another example, the AND gate 998 is not included in the AC detection component 1810. In yet another example, the gate control signal 1824 is equal to a logic sum of the detection signal 1814 and the pulse signal 912.

Figure 10:
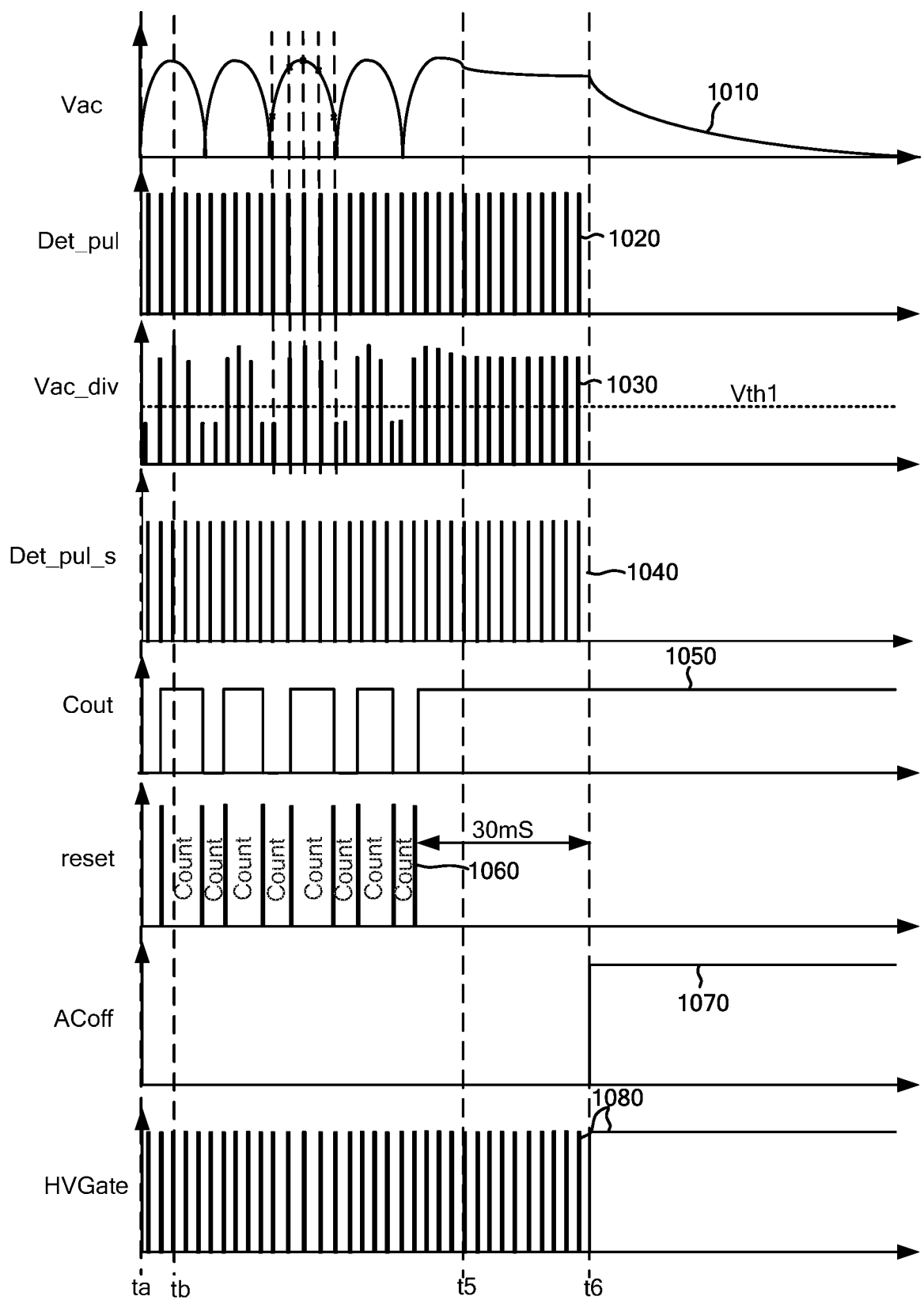
FIG. 10 is a simplified timing diagram for generating a detection signal by the AC detection component of FIG. 9 as part of the controller for the switch-mode power conversion system of FIG. 8 according to an embodiment of the present invention.

FIG. 10 is a simplified timing diagram for generating the detection signal 1814 by the AC detection component 1810 as part of the controller 840 for the switch-mode power conversion system 800 according to an embodiment of the present invention. This diagram is merely an example, which should not unduly limit the scope of the claims. One of ordinary skill in the art would recognize many variations, alternatives, and modifications.

The waveform 1010 represents the signal 1822 as a function of time, the waveform 1020 represents the pulse signal 912 as a function of time, the waveform 1030 represents the sampled signal 922 as a function of time, and the waveform 1040 represents the pulse signal 914 as a function of time. Additionally, the waveform 1050 represents the signal 952 as a function of time, the waveform 1060 represents the signal 962 as a function of time, and the waveform 1070 represents the detection signal 1814 as a function of time. Moreover, the waveform 1080 represents the gate control signal 1824 as a function of time.

Figure 11:
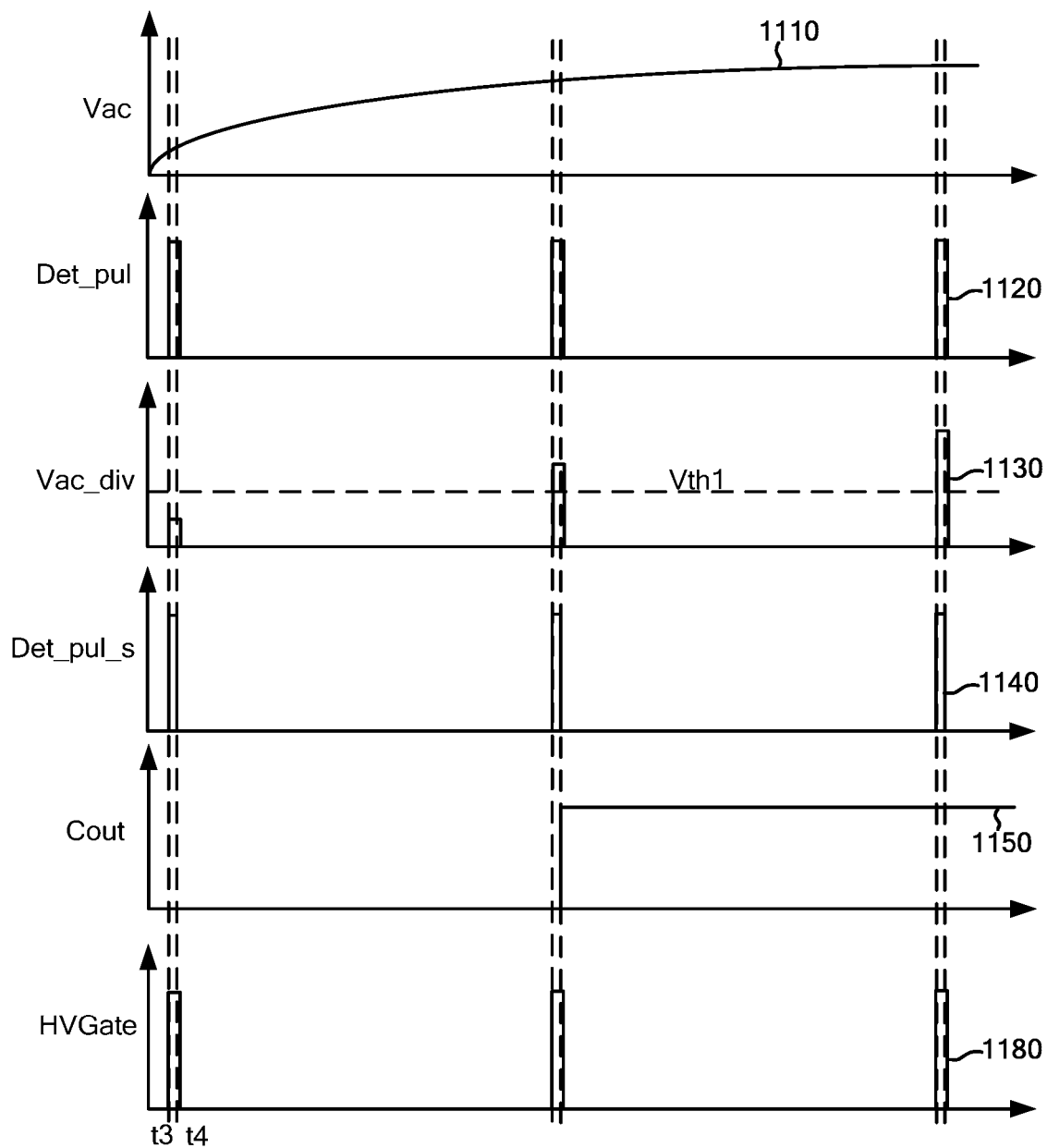
FIG. 11 is a simplified timing diagram for generating the detection signal by the AC detection component of FIG. 9 as part of the controller for the switch-mode power conversion system of FIG. 8 according to another embodiment of the present invention.

FIG. 11 is a simplified timing diagram for generating the detection signal 1814 by the AC detection component 1810 as part of the controller 840 for the switch-mode power conversion system 800 according to another embodiment of the present invention. This diagram is merely an example, which should not unduly limit the scope of the claims. One of ordinary skill in the art would recognize many variations, alternatives, and modifications. The waveforms 1110, 1120, 1130, 1140, 1150, and 1180 are expanded views (e.g., from time $t_a$ to time $t_b$) for the waveforms 1010, 1020, 1030, 1040, 1050, and 1080 respectively.

As discussed above and further emphasized here, FIGS. 8 and 9 are merely examples, which should not unduly limit the scope of the claims. One of ordinary skill in the art would recognize many variations, alternatives, and modifications. For example, the debounce component 940 is removed, and thus the signal 932 is the same as the signal 942. In another example, the sampling component 920 and the voltage control component 1820 are combined by sharing some components. In yet another example, the AC detection component 1810 is not used as part of the controller 840, but used as an independent device or as a component in one or more other devices.

Figure 12:
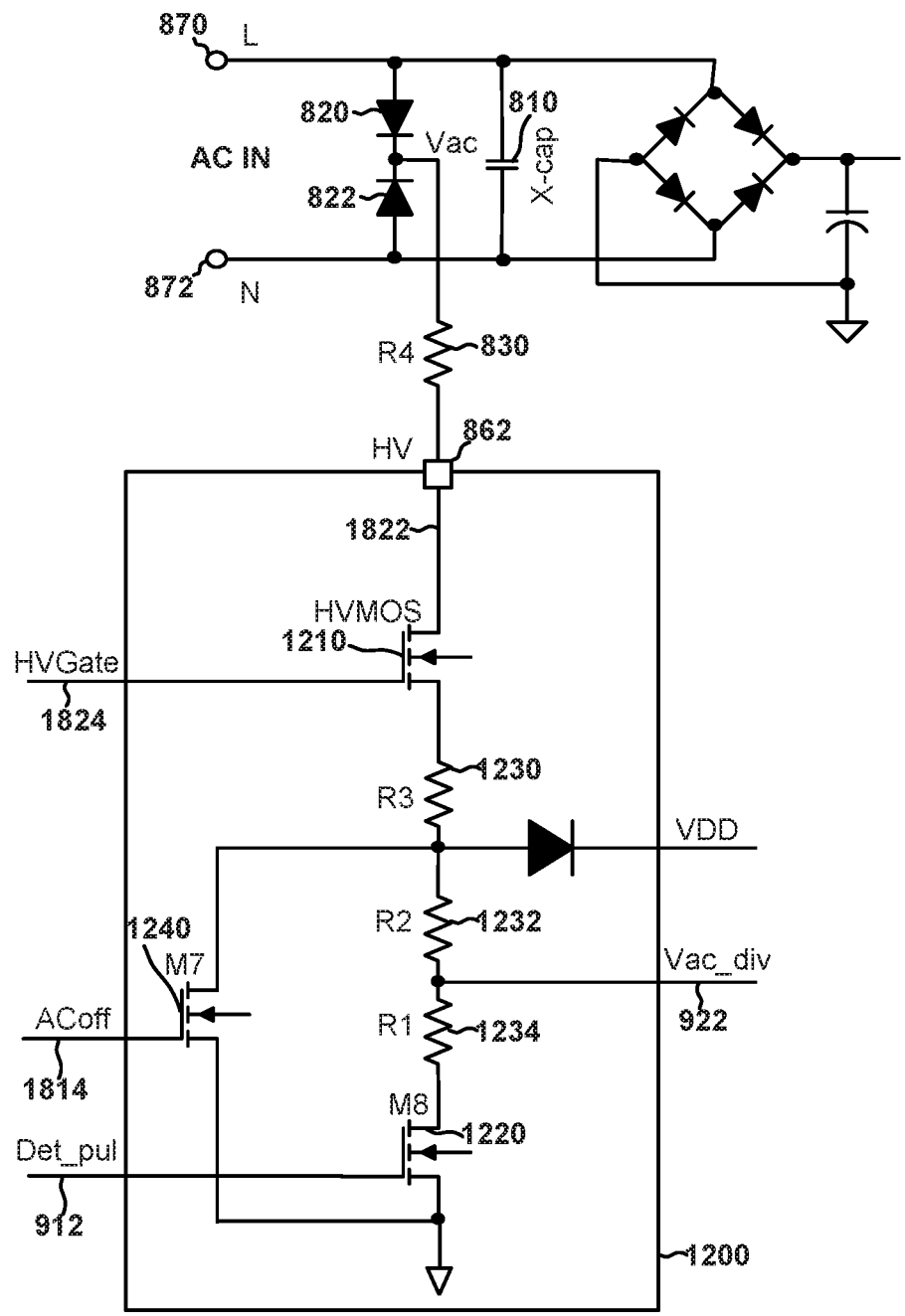
FIG. 12 is a simplified diagram showing a combination component for a sampling component and a voltage control component of FIG. 9 as parts of the controller for the switch-mode power conversion system of FIG. 8 according to an embodiment of the present invention.

FIG. 12 is a simplified diagram showing a combination component for the sampling component 920 and the voltage control component 1820 as parts of the controller 840 for the switch-mode power conversion system 800 according to an embodiment of the present invention. This diagram is merely an example, which should not unduly limit the scope of the claims. One of ordinary skill in the art would recognize many variations, alternatives, and modifications.

The combined component 1200 includes transistors 1210, 1220, and 1240, and resistors 1230, 1232, and 1234. For example, the transistors 1210 and 1220 and the resistors 1232, and 1234 are used as part of the sampling component 920. In another example, the transistors 1210 and 1240 and the resistor 1230 are used as part of the voltage control component 1820. In yet another example, the transistor 1210 is a MOS transistor that sustains a high voltage (e.g., 600 volts). In yet another example, the transistor 1210 is an N-channel field effect transistor (FET). In yet another example, the transistor 1240 is an N-channel FET. In yet another example, the transistor 1220 is an N-channel FET.

In one embodiment, a source terminal of the transistor 1210 is connected to the resistor 1230. For example, a drain terminal of the transistor 1240 is connected to both the resistor 1230 and the resistor 1232 and a source terminal of the transistor 1240 is biased at a chip-ground voltage 1292. In another example, a drain terminal of the transistor 1220 is connected to the resistor 1234 and a source terminal of the transistor 1220 is biased at a chip-ground voltage 1292. In yet another example, the resistors 1232 and 1234 are connected.

As discussed above, and further emphasized here, FIG. 12 is merely an example, which should not unduly limit the scope of the claims. One of ordinary skill in the art would recognize many variations, alternatives, and modifications. For example, the combination component 1200 is not used as part of the controller 840, but used as an independent device or as a component in one or more other devices.

Figure 13:
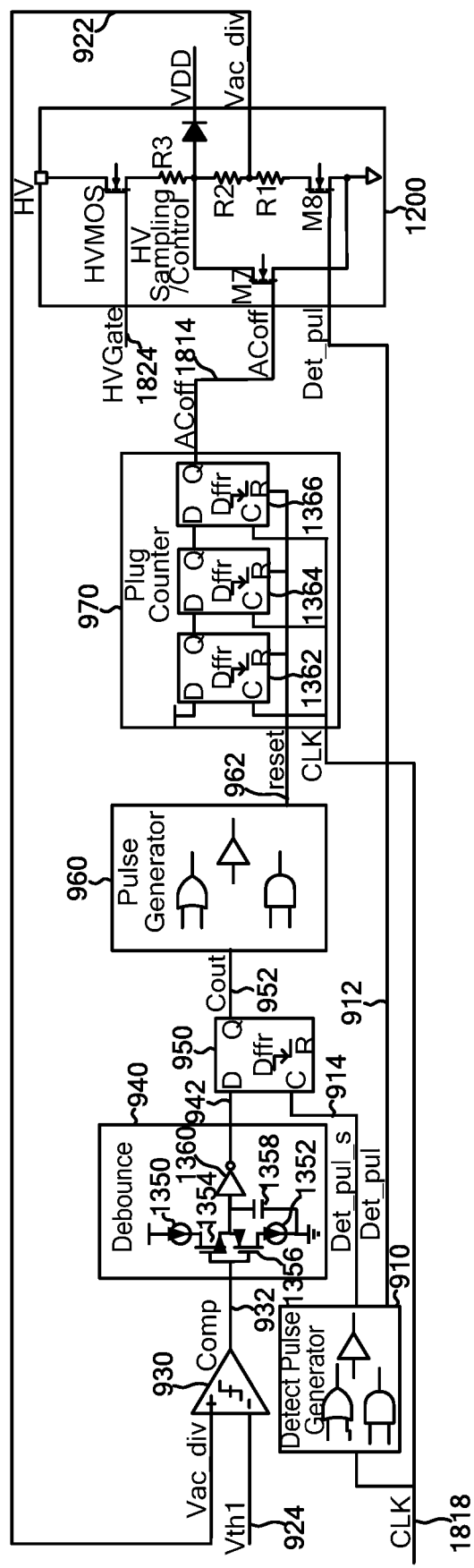
FIG. 13 is a simplified diagram showing the AC detection component and the voltage control component of FIG. 9 as parts of the controller for the switch-mode power conversion system of FIG. 8 according to an embodiment of the present invention.

FIG. 13 is a simplified diagram showing the AC detection component 1810 and the voltage control component 1820 as parts of the controller 840 for the switch-mode power conversion system 800 according to an embodiment of the present invention. This diagram is merely an example, which should not unduly limit the scope of the claims. One of ordinary skill in the art would recognize many variations, alternatives, and modifications. For example, the debounce component 940 includes two current sources 1350 and 1352, two transistors 1354 and 1356, a capacitor 1358 and an inverter 1360. In another example, the counter 970 includes three D flip-flops 1362, 1364 and 1366.

As shown in FIG. 9, FIG. 10, FIG. 11, FIG. 12, and/or FIG. 13, the pulse generator 910 generates pulses periodically for the pulse signal 912 (e.g., corresponding to the waveform 1020 and/or the waveform 1120), and also generates pulses periodically for the pulse signal 914 (e.g., corresponding to the waveform 1040 and/or the waveform 1140) according to some embodiments. For example, the pulse signal 912 (e.g., Det_pul) has a same frequency as the pulse signal 914 (e.g., Det_pul_s). In another example, the pulse signal 912 (e.g., Det_pul) has a larger duty cycle than the pulse signal 914 (e.g., Det_pul_s). In yet another example, the pulse signal 912 (e.g., Det_pul) has a frequency equal to 500 Hz and a duty cycle equal to 1%. In another example, the pulse signal 914 (e.g., Det_pul_s) has a frequency equal to 500 Hz and a duty cycle equal to 0.5%. In yet another example, a rising edge of the pulse signal 912 and a rising edge of the pulse signal 914 appear at the same time.

In one embodiment, the pulse signal 912 (e.g., corresponding to the waveform 1020 and/or the waveform 1120) is received by the transistor 1220, which is turned on by the pulses. For example, the transistor 1210 is also turned on by the pulses of the gate control signal 1824 (e.g., corresponding to the waveform 1080 and/or the waveform 1180). In another example, when both the transistors 1210 and 1220 are turned on, the signal 1822 is received by a voltage divider that includes the resistors 1230, 1232, and 1234 and outputs the sampled signal 922 (e.g., at time $t_3$ as shown in FIG. 11) as follows (e.g., assuming that the on-resistance of the transistor 1210 and the on-resistance of the transistor 1220 are both small):

$$V_{ac\_div} = V_{ac} \times \frac{R_1}{R_1 + R_2 + R_3 + R_4} \quad \text{(Equation 3)}$$

where $V_{ac\_div}$ represents the voltage level of the sampled signal 922, and $V_{ac}$ represents the voltage level of the signal 1822. Additionally, $R_1$, $R_2$, $R_3$, and $R_4$ represent the resistance values of the resistors 1234, 1232, 1230 and 830 respectively.

In another embodiment, the sampled signal 922 (e.g., corresponding to the waveform 1030 and/or the waveform 1130) is received by the comparator 930 (e.g., as shown in FIG. 9 and/or FIG. 13), which compares the sampled signal 922 with the threshold signal 924, and outputs the comparison signal 932. For example, the comparison signal 932 is received by the debounce component 940, which in response generates the signal 942. In another example, the signal 942 is received by the flip-flop component 950, which locks the signal 952 (e.g., corresponding to the waveform 1050 and/or the waveform 1150) as the same as the signal 942 at the falling edge of the pulse signal 914 (e.g., at time $t_4$ as shown in FIG. 11 that corresponds to the falling edge of the waveform 1140). In yet another example, if the voltage level of the sampled signal 922 (e.g., corresponding to the waveform 1030 and/or the waveform 1130) is smaller than the threshold signal 924, the signal 952 (e.g., corresponding to the waveform 1050 and/or the waveform 1150) is at a logic low level. In yet another example, if the voltage level of the sampled signal 922 (e.g., corresponding to the waveform 1030 and/or the waveform 1130) is larger than the threshold signal 924, the signal 952 (e.g., corresponding to the waveform 1050 and/or the waveform 1150) is at a logic high level.

In yet another embodiment, the signal 952 is received by the pulse generator 960, which detects rising edges and falling edges of the signal 952 (e.g., corresponding to the waveform 1050 and/or the waveform 1150), and in response generates pulses for the signal 962 (e.g., corresponding to the waveform 1060). For example, the signal 962 is received by the counter 970, which is reset by the pulses of the signal 962 (e.g., corresponding to the waveform 1060) and counts the lapse of time since the last reset. In another example, if the lapse of time since the last reset reaches a predetermined value (e.g., 30 ms), the counter 970 generates the detection signal 1814 (e.g., changing to the logic high level at time $t_6$ as shown in FIG. 10) to indicate the AC input terminals 870 and 872 are no longer provided with the AC input voltage. In yet another example, the AC input terminals 870 and 872 stop being provided with the AC input voltage at time $t_5$ as shown in FIG. 10.

As shown in FIG. 12 and/or FIG. 13, the detection signal 1814 (e.g., corresponding to the waveform 1070) is received by the transistor 1240 according to certain embodiments. For example, the transistor 1240 is turned on when the detection signal 1814 is at the logic high level. In another example, the transistor 1210 is also turned on when the gate control signal 1824 (e.g., corresponding to the waveform 1080 and/or the waveform 1180) is at the logic high level. In yet another example, when both the transistors 1210 and 1240 are turned on, the transistors 1210 and 1240, together with the diodes 820 and 822 and the resistors 830 and 1230, form a discharging path for the AC input capacitor 810. In yet another example, the discharging current on the discharging path is at a predetermined level, e.g., 3 mA. In yet another example, when both the transistors 1210 and 1240 are turned on, the AC input capacitor 810 is discharged by reducing the voltage magnitude of the signal 1822 through the terminal 862.

Figure 14:
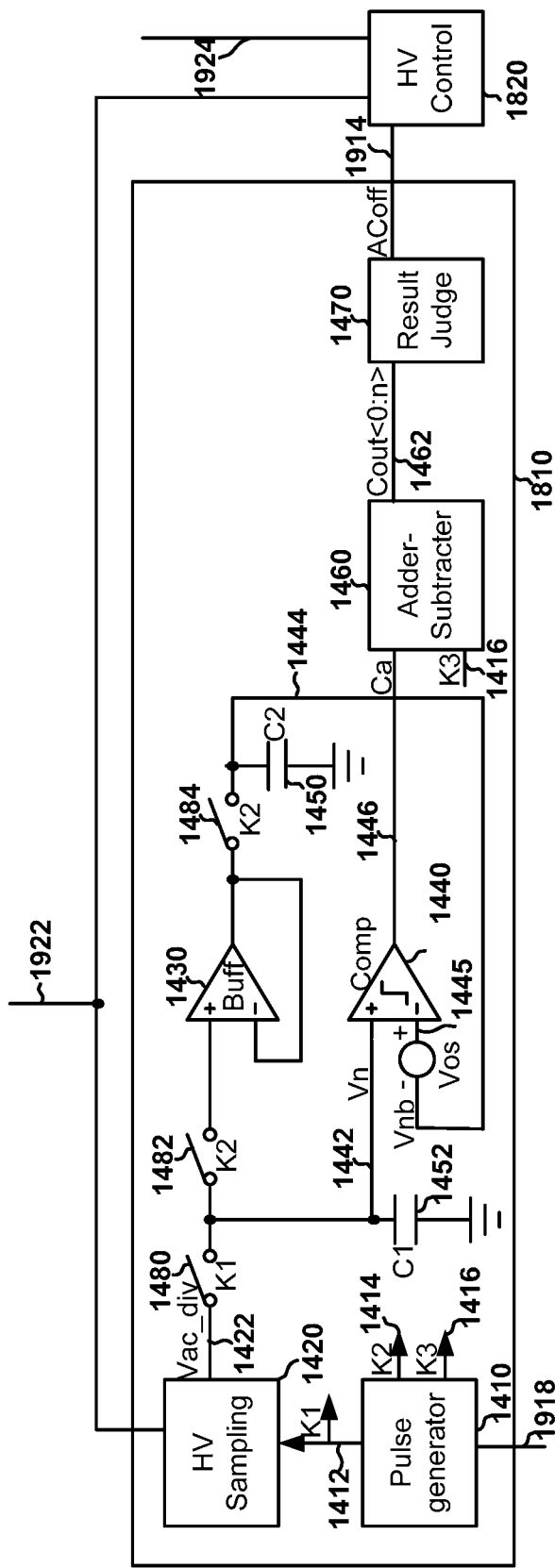
FIG. 14 is a simplified diagram showing an AC detection component as part of the controller for the switch-mode power conversion system of FIG. 8 according to another embodiment of the present invention.

FIG. 14 is a simplified diagram showing the AC detection component 1810 as part of the controller 840 for the switch-mode power conversion system 800 according to another embodiment of the present invention. This diagram is merely an example, which should not unduly limit the scope of the claims. One of ordinary skill in the art would recognize many variations, alternatives, and modifications. The AC detection component 1810 includes a pulse generator 1410, a sampling component 1420, a buffer 1430, a comparator 1440, capacitors 1450 and 1452, a component 1460 for addition and subtraction, a determination component 1470, switches 1480, 1482, and 1484.

According to one embodiment, the pulse generator 1410 of the AC detection component 1810 receives a clock signal 1918 and generates signals 1412, 1414, and 1416. For example, the signal 1412 is received by the sampling component 1420, and also received by the switch 1480 as a control signal. In another example, the signal 1414 is received by the switches 1482 and 1484 as control signals.

In yet another example, the signal 1416 is received by the component 1460. In yet another example, the switch 1480 is closed when the signal 1412 is at the logic high level. In yet another example, the switches 1482 and 1484 are closed when the signal 1414 is at the logic high level.

According to another embodiment, the signal 1412 is the same as the signal 912, and the sampling component 1420 is the same as the sampling component 920. For example, the sampling component 1420 samples a signal 1922 through the terminal 862 (e.g., sampling 10 times within each AC period), and generates a sampled signal 1422. In another example, the sampled signal 1422 is the same as the sampled signal 922.

According to yet another embodiment, when the signal 1414 is at the logic high level, the voltage across the capacitor 1452 is duplicated, by at least the buffer 1430, as the voltage across the capacitor 1450. For example, the sampled signal 1422 previously obtained is preserved as a signal 1444 (e.g., the $V_{nb}$ signal), and the sampled signal 1422 later obtained is represented by a signal 1442 (e.g., the $V_n$ signal). In another example, the comparator 1440 receives the signal 1442 and a signal 1445 that is equal to the signal 1444 plus a predetermined offset, Vos, and outputs a comparison signal 1446 (e.g., the Ca signal) to the component 1460 for addition and subtraction. In yet another example, if the signal 1442 is equal to the signal 1444 in magnitude, the comparator 1440 outputs the comparison signal 1446 at a logic low level.

As shown in FIG. 14, the component 1460 for addition and subtraction (e.g., an incremental and decremental counter) detects the comparison signal 1446 and generates a count signal 1462 based on at least information associated with the comparison signal 1446 according to one embodiment. For example, if the component 1460 detects at a particular time (e.g., at a falling edge of the signal 1416) the comparison signal 1446 is at the logic high level, the number represented by the count signal 1462 is decreased by 1. In another example, if the component 1460 detects at the particular time (e.g., at the falling edge of the signal 1416) the comparison signal 1446 is at the logic low level, the number represented by the count signal 1462 is increased by 1. In yet another example, after every N additions and subtractions (e.g., N is an integer no less than 1), the number represented by the count signal 1462 is reset to 0.

In another embodiment, the determination component 1470 receives the count signal 1462, and generates the detection signal 1814 For example, the determination component 1470 determines the number represented by the count signal 1462, and if the number represented by the count signal 1462 is larger than a predetermined number or smaller than another predetermined number, generates the detection signal 1914 to indicate the AC input terminals 870 and 872 are no longer provided with the AC input voltage. In another example, if the AC input terminals 870 and 872 are provided with the AC input voltage, the sampled signal 1422 should change up and down in magnitude; hence if during a predetermined time period (e.g., much longer than half a period of the AC input voltage signal), the sampled signal 1422 decreases monotonically, increases monotonically, or remains unchanged, the AC input terminals 870 and 872 are determined to be no longer provided with the AC input voltage.

As discussed above, and further emphasized here, FIG. 14 is merely an example, which should not unduly limit the scope of the claims. One of ordinary skill in the art would recognize many variations, alternatives, and modifications. For example, instead of detecting the comparison signal 1446 at the falling edge of the signal 1416, the component 1460 detects the comparison signal 1446 at a rising edge of the signal 1416. In another example, if the signal 1442 is equal to the signal 1444 in magnitude, the comparator 1440 outputs the comparison signal 1446 at a logic high level. In yet another example, if the component 1460 detects that the comparison signal 1446 is at the logic high level, the number represented by the count signal 1462 is increased by 1. In yet another example, if the component 1460 detects the comparison signal 1446 is at the logic low level, the number represented by the count signal 1462 is decreased by 1.

Figure 15:
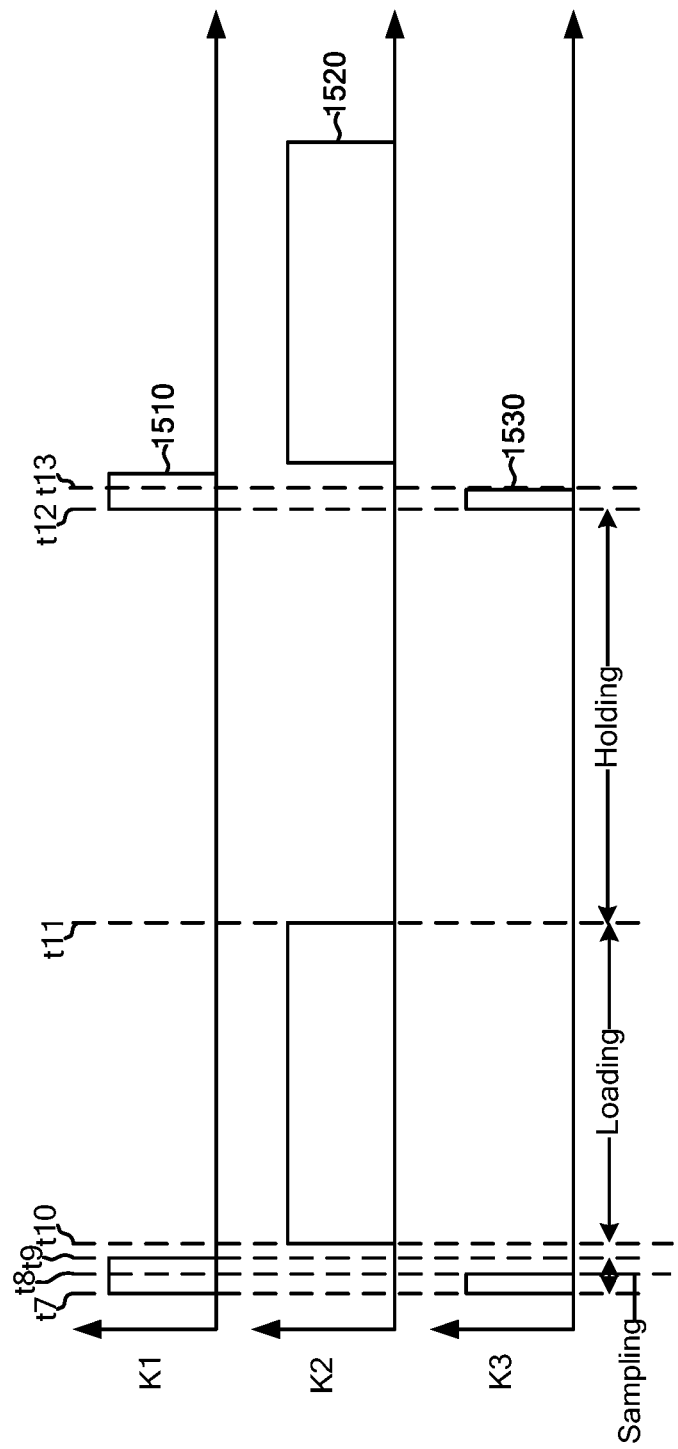
FIG. 15 is a simplified timing diagram for generating a detection signal by the AC detection component of FIG. 14 as part of the controller for the switch-mode power conversion system FIG. 8 according to another embodiment of the present invention.

FIG. 15 is a simplified timing diagram for generating the detection signal 1914 by the AC detection component 1810 as part of the controller 840 for the switch-mode power conversion system 800 according to another embodiment of the present invention. This diagram is merely an example, which should not unduly limit the scope of the claims. One of ordinary skill in the art would recognize many variations, alternatives, and modifications.

The waveform 1510 represents the signal 1412 as a function of time, the waveform 1520 represents the signal 1414 as a function of time, and the waveform 1530 represents the signal 1416 as a function of time. Seven timing reference points $t_7$, $t_8$, $t_9$, $t_{10}$, $t_{11}$, $t_{12}$, and $t_{13}$ are shown in FIG. 15. For example, $t_7 \leq t_8 \leq t_9 \leq t_{10} \leq t_{11} \leq t_{12} \leq t_{13}$.

In one embodiment, during the time period between $t_7$ and $t_9$, the signal 1412 (e.g., corresponding to the waveform 1510) is at the logic high level; hence the switch 1480 is closed and the sampled signal 1422 is represented by the voltage across the capacitor 1452 (e.g., as shown by the signal 1442). For example, during the time period between $t_{10}$ to $t_{11}$, the signal 1414 (e.g., corresponding to the waveform 1520) is at the logic high level; hence the switches 1482 and 1484 are closed and the voltage across the capacitor 1452 (e.g., as shown by the signal 1442) is represented by the voltage across the capacitor 1450 (e.g., as shown by the signal 1444). In another example, during the time period between $t_{11}$ to $t_{12}$, both the signals 1412 and 1414 are at the logic low level; hence the switches 1480, 1482 and 1484 are open and the signal 1444 is preserved to represent the sampled signal 1422 that was obtained during the previous sampling process. In yet another example, during the time period between $t_{12}$ to $t_{13}$, the signal 1412 is at the logic high level; hence the sampled signal 1422 is generated during the current sampling process and represented by the signal 1442, which is compared with the signal 1444. In yet another example, at $t_{13}$, the comparison signal 1446 is received by the component 1460 for addition and subtraction, and the component 1460 generates, at the falling edge of the signal 1416, the count signal 1462 based on at least information associated with the comparison signal 1446.

According to another embodiment, a system for discharging a capacitor includes a signal detector and a discharge control component. The signal detector is configured to receive an input signal and generate a detection signal based on at least information associated with the input signal, the input signal being associated with an alternate current signal received by a capacitor including a first capacitor terminal and a second capacitor terminal. A discharge control component is configured to receive at least the detection signal and generate an output signal to discharge the capacitor if the detection signal satisfies one or more conditions. For example, the system is implemented according to FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14 and/or FIG. 15.

According to another embodiment, a system for detecting an input signal includes a comparator, a pulse generator, and a detection component. The comparator is configured to receive an input signal and a threshold signal and generate a comparison signal based on at least information associated with the input signal and the threshold signal. The pulse generator is configured to generate a pulse signal based on at least information associated with the comparison signal. The detection component is configured to receive the pulse signal and generate a detection signal based on at least information associated with the pulse signal. The comparator is further configured to change the comparison signal from a first logic level to a second logic level if the input signal changes from a first input value larger than the threshold signal to a second input value smaller than the threshold signal. In addition, the comparator is configured to change the comparison signal from the second logic level to the first logic level if the input signal changes from a third input value smaller than the threshold signal to a fourth input value larger than the threshold signal. The pulse generator is further configured to generate a pulse if the comparison signal is changed from the first logic level to the second logic level or if the comparison signal is changed from the second logic level to the first logic level. Furthermore, the detection component is further configured to change the detection signal from a third logic level to a fourth logic level if no pulse is generated by the pulse generator for a predetermined time period. For example, the system is implemented according to at least FIG. 2, FIG. 3, FIG. 4, FIG. 5, and/or FIG. 7.

According to yet another embodiment, a system for discharging a device includes a first transistor including a first transistor terminal, a second transistor terminal and a third transistor terminal, a second transistor including a fourth transistor terminal, a fifth transistor terminal and a sixth transistor terminal, a third transistor including a seventh transistor terminal, an eighth transistor terminal and a ninth transistor terminal, and a fourth transistor including a tenth transistor terminal, an eleventh transistor terminal and a twelfth transistor terminal. The second transistor terminal is connected to the fourth transistor terminal. The fifth transistor terminal is connected to the seventh transistor terminal. The eighth transistor terminal is connected to the eleventh terminal and configured to receive an input signal. Additionally, the system is further configured to, if the input signal satisfies one or more conditions, turn on the first transistor and the fourth transistor, and discharge the device through at least the first transistor and the fourth transistor. For example, the system is implemented according to at least FIG. 2, FIG. 3, FIG. 6, and/or FIG. 7.

In one embodiment, a system for detecting an input signal includes a signal detector, a comparator, a first pulse generator, and a detection component. The signal detector is configured to sample an input signal and generate one or more sampled signals including a first sampled signal. The comparator is configured to receive the one or more sampled signals and a threshold signal and generate a comparison signal based on at least information associated with the one or more sampled signals and the threshold signal. The first pulse generator is configured to generate a first pulse signal based on at least information associated with the comparison signal. The detection component is configured to receive the first pulse signal and generate a detection signal based on at least information associated with the first pulse signal. The comparator is further configured to, if the first sampled signal is smaller than the threshold signal, generate the comparison signal at a first logic level. Additionally, the comparator is configured to, if the first sampled signal is larger than the threshold signal, generate the comparison signal at a second logic level. Moreover, the first pulse generator is further configured to generate a pulse if the comparison signal is changed from the first logic level to the second logic level or if the comparison signal is changed from the second logic level to the first logic level. The detection component is further configured to change the detection signal from a third logic level to a fourth logic level if no pulse is generated by the first pulse generator for a predetermined time period. For example, the system is implemented according to at least FIG. 8, FIG. 9, FIG. 10, FIG. 11, and/or FIG. 13.

In another embodiment, a system for detecting an input signal and discharging a device includes a first transistor including a first transistor terminal, a second transistor terminal and a third transistor terminal, a second transistor including a fourth transistor terminal, a fifth transistor terminal and a sixth transistor terminal, and a third transistor including a seventh transistor terminal, an eighth transistor terminal and a ninth transistor terminal. The system further includes a first resistor including a first resistor terminal and a second resistor terminal, and a second resistor including a third resistor terminal and a fourth resistor terminal. The third transistor terminal is connected, directly or indirectly, to the fourth transistor terminal. The third transistor terminal is connected, directly or indirectly, to the first resistor terminal. The second resistor terminal is connected to the third resistor terminal. The fourth resistor terminal is connected to the seventh transistor terminal. The first transistor terminal is configured to receive an input signal. The second transistor terminal is configured to receive a first drive signal. The fifth transistor terminal is configured to receive a second drive signal. Moreover, the eighth transistor terminal is configured to receive a third drive signal. The system is further configured to, if the first drive signal satisfies one or more first conditions and the second drive signal satisfies one or more second conditions, turn on the first transistor and the second transistor, and discharge the device through at least the first transistor and the second transistor. In addition, the system is further configured to, if the first drive signal satisfies the one or more first conditions and the third drive signal satisfies one or more third conditions, turn on the first transistor and the third transistor, and generate an output signal based on at least information associated with the input signal. For example, the system is implemented according to at least FIG. 8, FIG. 9, FIG. 10, FIG. 11, FIG. 12, and/or FIG. 13.

In yet another embodiment, a system for detecting an input signal includes a signal detector, a comparator, a counting component, and a detection component. The signal detector is configured to sample an input signal at a plurality of times during a first predetermined time period and generate a plurality of sampled signals corresponding to the plurality of times respectively, the plurality of times including a first time and a second time immediately after the first time, the plurality of sampled signals including a first sampled signal corresponding to the first time and a second sampled signal corresponding to the second time. The comparator is configured to receive the plurality of sampled signals and generate a comparison signal based on at least information associated with the plurality of sampled signals. The counting component is configured to receive at least the comparison signal and change a value based on at least information associated with the comparison signal. The detection component is configured to generate a detection signal based on at least information associated with the value. The comparator is further configured to, if the first sampled signal is smaller than the second sampled signal, generate the comparison signal at a first logic level. Additionally, the comparator is configured to, if the first sampled signal is larger than the second sampled signal, generate the comparison signal at the second logic level. The counting component is further configured to increase the value by a first predetermined magnitude if the comparison signal is at the first logic level, and decrease the value by a second predetermined magnitude if the comparison signal is at the second logic level. The detection component is further configured to change the detection signal from a third logic level to a fourth logic level if the value is larger than a first threshold or smaller than a second threshold after the first predetermined time period. For example, the system is implemented according to at least FIG. 8, FIG. 14 and/or FIG. 15.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for discharging a capacitor, the system comprising:
   a signal detector configured to:
      receive an input signal;
      compare the input signal with a predetermined threshold; and
      generate a detection signal based on at least information associated with the input signal, the input signal being associated with an alternate current signal received by a capacitor including a first capacitor terminal and a second capacitor terminal; and
   a discharge control component configured to receive at least the detection signal and generate an output signal to discharge the capacitor if the detection signal satisfies one or more conditions;
   wherein the discharge control component is further configured to generate the output signal to discharge the capacitor if the detection signal indicates that during a predetermined time period, the input signal remains larger than the predetermined threshold.

2. The system of claim 1 wherein the discharge control component is further configured to generate the output signal to discharge the capacitor if the detection signal indicates the capacitor is disconnected from the alternate current signal.

3. The system of claim 1, and further comprising:
   a first diode including a first diode terminal and a second diode terminal; and
   a second diode including a third diode terminal and a fourth diode terminal;
   wherein:
      the second diode terminal is connected to the third diode terminal;
      the first diode terminal is connected to the first capacitor terminal; and
      the fourth diode terminal is connected to the second capacitor terminal.

4. The system of claim 3 wherein:
   the second diode terminal and the third diode terminal are cathode terminals; and
   the first diode terminal and the fourth diode terminal are anode terminals.

5. The system of claim 3 wherein the discharge control component is further configured to provide the output signal to the second diode terminal and the third diode terminal.

6. The system of claim 1, and further comprising:
   a first resistor including a first resistor terminal and a second resistor terminal; and
   a second resistor including a third resistor terminal and a fourth resistor terminal;
   wherein:
      the first resistor terminal is connected to the capacitor;
      the second resistor terminal is connected to the third resistor terminal; and
      the signal detector is further configured to receive the input signal from the second resistor terminal.

7. The system of claim 6 wherein the fourth resistor terminal is biased at a predetermined voltage.

8. The system of claim 1 wherein the signal detector is further configured to:
   compare a time period during which the input signal remains larger than the predetermine threshold with the predetermined time period.

9. The system of claim 8, wherein the discharge control component is further configured to generate the output signal that does not discharge the capacitor if the detection signal indicates that the time period is smaller than the predetermined time period.

10. A system for discharging a capacitor, the system comprising:
    a signal detector configured to:
       receive an input signal;
       compare the input signal with a predetermined threshold; and
       generate a detection signal based on at least information associated with the input signal, the input signal being associated with an alternate current signal received by a capacitor including a first capacitor terminal and a second capacitor terminal; and
    a discharge control component configured to receive at least the detection signal and generate an output signal to discharge the capacitor if the detection signal satisfies one or more conditions;
    wherein the discharge control component is further configured to generate the output signal to discharge the capacitor if the detection signal indicates that during a predetermined time period, the input signal remains smaller than the predetermined threshold.

11. The system of claim 10 wherein the discharge control component is further configured to generate the output signal to discharge the capacitor if the detection signal indicates the capacitor is disconnected from the alternate current signal.

12. The system of claim 10, and further comprising:
    a first diode including a first diode terminal and a second diode terminal; and a second diode including a third diode terminal and a fourth diode terminal;

wherein:

the second diode terminal is connected to the third diode terminal;

the first diode terminal is connected to the first capacitor terminal; and the fourth diode terminal is connected to the second capacitor terminal.

13. The system of claim 12 wherein:

the second diode terminal and the third diode terminal are cathode terminals; and the first diode terminal and the fourth diode terminal are anode terminals.

14. The system of claim 12 wherein the discharge control component is further configured to provide the output signal to the second diode terminal and the third diode terminal.

15. The system of claim 10, and further comprising:

a first resistor including a first resistor terminal and a second resistor terminal; and a second resistor including a third resistor terminal and a fourth resistor terminal;

wherein:

the first resistor terminal is connected to the capacitor;

the second resistor terminal is connected to the third resistor terminal; and the signal detector is further configured to receive the input signal from the second resistor terminal.

16. The system of claim 15 wherein the fourth resistor terminal is biased at a predetermined voltage.

17. The system of claim 10 wherein the signal detector is further configured to:

compare a time period during which the input signal remains smaller than the predetermine threshold with the predetermined time period.

18. The system of claim 17, wherein the discharge control component is further configured to generate the output signal that does not discharge the capacitor if the detection signal indicates that the time period is smaller than the predetermined time period.

\* \* \* \* \*